(12) United States Patent
MéLinand et al.

(10) Patent No.: US 10,976,918 B2
(45) Date of Patent: Apr. 13, 2021

(54) SYSTEM AND METHOD OF GUIDING HANDWRITING DIAGRAM INPUT

(71) Applicant: MyScript, Nantes (FR)

(72) Inventors: Robin MéLinand, Nantes (FR); Romain Bednarowicz, Nantes (FR); Claire Sidoli, Nantes (FR); Fabien Ric, Nantes (FR); Nicolas Rucine, Nantes (FR); Erwan Jestin, Nantes (FR); Anthony Laurence, Nantes (FR); Khaoula Elagouni, Nantes (FR); Cyril Cerovic, Nantes (FR); Anne Bonnaud, Nantes (FR)

(73) Assignee: MYSCRIPT, Nantes (FR)

( * ) Notice: Subject to any disclaimer, the term of this patent is extended or adjusted under 35 U.S.C. 154(b) by 58 days.

(21) Appl. No.: 14/955,198

(22) Filed: Dec. 1, 2015

(65) Prior Publication Data
US 2017/0109032 A1   Apr. 20, 2017

(30) Foreign Application Priority Data

Oct. 19, 2015 (EP) .................................... 15290270

(51) Int. Cl.
*G06F 3/0488* (2013.01)
*G06K 9/00* (2006.01)
(Continued)

(52) U.S. Cl.
CPC ........ *G06F 3/04883* (2013.01); *G06F 3/0482* (2013.01); *G06F 3/04817* (2013.01);
(Continued)

(58) Field of Classification Search
CPC .......... G06F 17/20; G06F 17/30; G06F 16/20; G06F 16/30; G06F 3/048; G06F 3/048;
(Continued)

(56) References Cited

U.S. PATENT DOCUMENTS

| 5,867,596 A | 2/1999 | Kano et al. |
| 8,718,375 B2 | 5/2014 | Ouyang et al. |

(Continued)

FOREIGN PATENT DOCUMENTS

| EP | 1973063 | 1/2011 |
| JP | H08-016805 A | 1/1996 |

(Continued)

OTHER PUBLICATIONS

International Search Report for Related Application No. PCT/EP2016/001723, dated Jan. 18, 2017, EPO-Internal, WPI Data.
(Continued)

*Primary Examiner* — Sanchita Roy
(74) *Attorney, Agent, or Firm* — McDermott Will & Emery LLP

(57) ABSTRACT

A system, method and computer program product for guiding hand-drawing of diagrams including text and non-text elements on a computing device are provided. The computing device has a processor and a non-transitory computer readable medium for detecting and recognizing hand-drawing diagram element input under control of the processor. Display is performed, on an interactive display of the computing device, of a guide element associated with at least one diagram element of displayed handwriting diagram input. The guide element is configured with a depiction of the at least one diagram element in recognized form.

20 Claims, 29 Drawing Sheets

(51) Int. Cl.
*G06F 40/166* (2020.01)
*G06F 40/171* (2020.01)
*G06F 3/0481* (2013.01)
*G06F 3/0482* (2013.01)

(52) U.S. Cl.
CPC .......... *G06F 40/166* (2020.01); *G06F 40/171* (2020.01); *G06K 9/00402* (2013.01); *G06K 9/00436* (2013.01); *G06K 2209/01* (2013.01)

(58) Field of Classification Search
CPC .. G06F 40/166; G06F 40/171; G06F 3/04817; G06F 3/0482; G06K 9/00; G06K 22/00; G06K 9/00402; G06K 9/00436; G06K 2209/01
See application file for complete search history.

(56) References Cited

U.S. PATENT DOCUMENTS

| | | | |
|---|---|---|---|
| 2003/0215145 A1 | 11/2003 | Shilman et al. | |
| 2005/0135678 A1* | 6/2005 | Wecker | G06F 3/04883 382/186 |
| 2006/0062471 A1 | 6/2006 | Xu et al. | |
| 2006/0233464 A1* | 10/2006 | Simmons | G06K 9/222 382/321 |
| 2008/0235211 A1* | 9/2008 | Saund | G06F 17/3053 |
| 2008/0260240 A1 | 10/2008 | Vukosavljevic et al. | |
| 2010/0171754 A1* | 7/2010 | Hatfield | G06F 17/242 345/619 |
| 2012/0141032 A1* | 6/2012 | Ouyang | G06K 9/00422 382/187 |
| 2014/0104201 A1 | 1/2014 | Tsutsui | |
| 2014/0177962 A1 | 6/2014 | Torgerson | |
| 2014/0210829 A1* | 7/2014 | Yokoyama | G06F 3/04883 345/467 |
| 2015/0213320 A1* | 7/2015 | Ookawara | G06F 3/04883 715/268 |

FOREIGN PATENT DOCUMENTS

| | | |
|---|---|---|
| JP | 2014-106766 A | 6/2014 |
| WO | 2015/087379 A1 | 6/2015 |
| WO | 2015087379 | 6/2015 |

OTHER PUBLICATIONS

Official Notice of Rejection dated Oct. 27, 2020 in Japanese Patent Application No. 2018-520079, with English Translation.

* cited by examiner

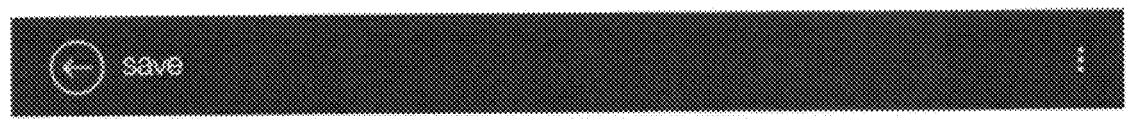
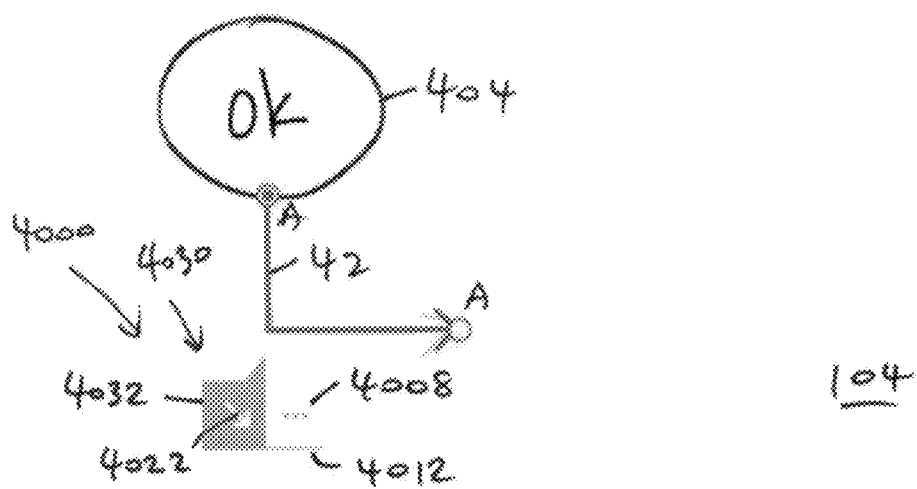
FIG. 13

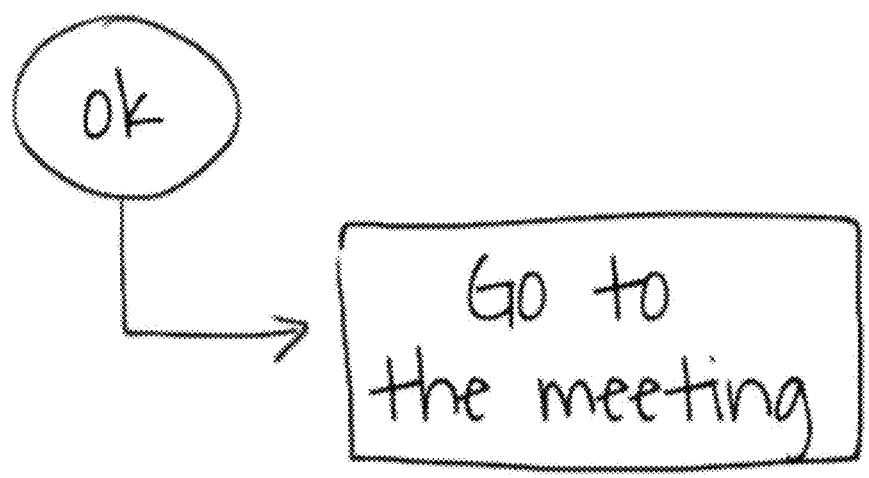
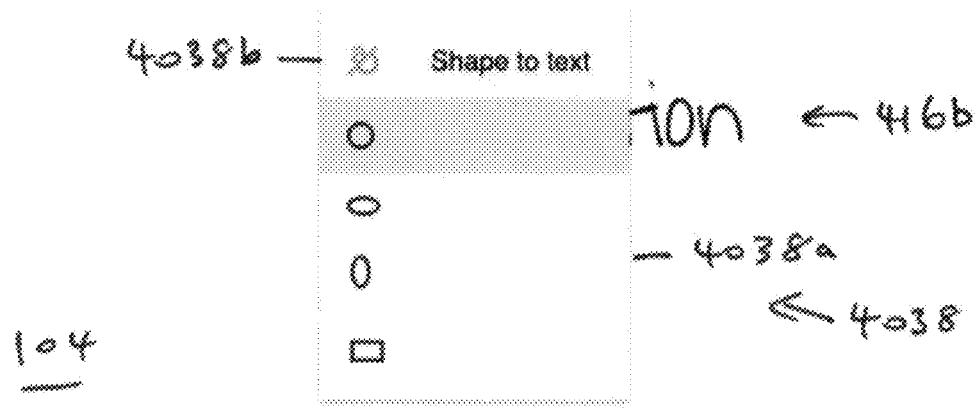
FIG. 18

SYSTEM AND METHOD OF GUIDING HANDWRITING DIAGRAM INPUT

CROSS-REFERENCE TO RELATED APPLICATIONS

This application claims priority to European Application No. 15290270.6 filed on Oct. 19, 2015, the entire contents of which is incorporated by reference herein.

TECHNICAL FIELD

The present invention relates generally to the field of computing device interfaces capable of recognizing user input handwriting of various graphics and text. In particular, the present invention provides systems and methods for guiding the hand-drawn input of diagram elements to produce digital diagram documents and interaction therewith.

BACKGROUND

Computing devices continue to become more ubiquitous to daily life. They take the form of computer desktops, laptop computers, tablet computers, e-book readers, mobile phones, smartphones, wearable computers, global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch surface. Any of these methods of input can be used generally for the handwritten or hand-drawn input of drawings and text which input is interpreted using a handwriting recognition system or method.

One application of handwriting recognition in computing devices is in the creation of diagrams which are hand-drawn on a computing device to be converted into typeset versions. Diagrams are drawings that explain or show arrangement and relations (as of parts). Diagrams generally include shapes having arbitrary or specific meanings and text with relationships to these shapes. There are many type of diagrams, such as flowcharts, organizational charts, concept maps, spider maps, block/architecture diagrams, mindmaps, block diagrams, Venn diagrams and pyramids. Diagrams generally include shapes, defining diagram blocks or containers, of different type (e.g., ovals, rectangles, diamonds, nested relationships of containers within containers), and connectors, of different type (e.g., straight lines, curved lines, straight arrows, curved arrows, branched lines), which connect or designate relationships between the diagram blocks, and text, contained in containers, associated to connectors or defined in text blocks having no associated shape or container. These myriad possible variations of combining the base components of shapes (connections with or without containers) and text in diagrams can cause issues for the accurate recognition of these elements input as hand-drawn or written content to a computing device.

Diagrams are particularly used in education and business settings where the user of the computing device creates a diagram, for example, during a lecture or meeting to capture concepts, issues or solutions being discussed. This is usually done by the user launching a handwritten diagram or sketch application on the computing device which accepts and interprets, either locally in the device or remotely via a communications link of the device, hand-drawn input on a touch sensitive surface or a surface monitored by a relative position detection system.

Conventionally such handwritten diagramming applications are limited in their capabilities to handle the above-described complexity of diagramming and typically constrain users to adopt behaviors or accept compromises which do not reflect the user's original intent. As a result some conventional handwritten diagramming applications force users to navigate menus to select and draw shapes and insert text in relation to shapes. As such, users are unable to draw shapes and connectors naturally or freely. Some other conventional handwritten diagramming applications rely on the order in which users draw different strokes to thereby guide the interpretation for recognition as expected behavior is followed. For example, the user may need to first draw two blocks/boxes before being able to define a connector between those boxes, or may have to draw a box before adding text thereto. This however is difficult for users, as they need to learn and implement the drawing/writing orders required which may need to be re-learnt if the application is not often used, and is non-intuitive, such that the ability to quickly capture diagrams is not supported. For example, a user may wish to prepare presentations on the go with a portable computing device, such as a tablet, or a user may wish to jot down a flow chart that their teacher has drawn in class on a computing device, such as a laptop with a touchscreen, and as such users need to be able to draw clear diagrams with mixed content without being an expert of the dedicated, cumbersome software.

Making the handwritten diagramming application smarter helps support users. That is, the application may be able to distinguish between different shapes, such as between blocks and connectors, and between shapes and text, thereby providing users with more freedom when creating diagrams. Even in conventional applications in which hand-drawn shapes and handwritten text are recognized well with reasonable creative freedom offered to users, typically the ability to change the drawn diagrams, such as to edit elements of the diagram to add, omit or replace elements, is limited where only certain operations are available and only available on the typeset version of the diagram, not on the handwritten input, so-called digital ink, and/or requires gestures to be learnt or selection to be made via menus, as described above.

Users typically desire real-time feedback, which is during writing, of the recognition of shapes and text when using diagramming applications. Some conventional applications provide such feedback mechanisms to users but these are generally limited in their effectiveness or are cumbersome in design. For example, available diagramming applications provide feedback by typesetting the handwritten input automatically (e.g., on-the-fly). However, such systems generally distract users from the flow of input since they must wait for the typesetting to be performed before carrying on with drawing. Other available handwritten note taking applications provide feedback by listing recognition candidates and the like during input. This is also very distracting for users.

SUMMARY

The examples of the present invention that are described herein below provide systems, methods and a computer program product for use in diagram creation with handwriting input to a computing device. The computer program product has a non-transitory computer readable medium with a computer readable program code embodied therein adapted to be executed to implement the method.

The computing device is connected to an input device in the form of an input surface. A user is able to provide input by applying pressure to or gesturing above the input surface using either his or her finger or an instrument such as a stylus or pen. The present system and method monitors the input strokes.

The computing device has a processor and at least one application for detecting and recognizing the handwriting input under control of the processor. The at least one system application is configured to cause display of, on an interactive display of the computing device, a guide element associated with at least one diagram element of displayed handwriting diagram input, the guide element configured with a depiction of the at least one diagram element in recognized form.

Another aspect of the disclosed system and method provides the guide element as including a dynamic prompter which dynamically displays the at least one diagram element depiction as the handwriting is input. The dynamic prompter includes at least one interactive prompter element, the at least one non-transitory computer readable medium configured to display of an action menu in response to receiving interaction with the at least one interactive prompter element.

Another aspect of the disclosed system and method provides display of the depiction of a non-text element in icon form. The non-text element may be a shape element of the diagram, with the icon depicting the shape.

Another aspect of the disclosed system and method provides display of the depiction of a text element in typeset ink.

BRIEF DESCRIPTION OF THE DRAWINGS

The present system and method will be more fully understood from the following detailed description of the examples thereof, taken together with the drawings. In the drawings like reference numerals depict like elements. In the drawings:

FIG. 13 shows the diagram state of FIG. 9 depicting selection of the combined shape element input of FIGS. 8 and 9 with associated components of the guide element;

FIG. 18 shows the diagram state of FIG. 17 depicting menu display from selection of a component of the guide element for the shape element;

DETAILED DESCRIPTION

Figure 1:
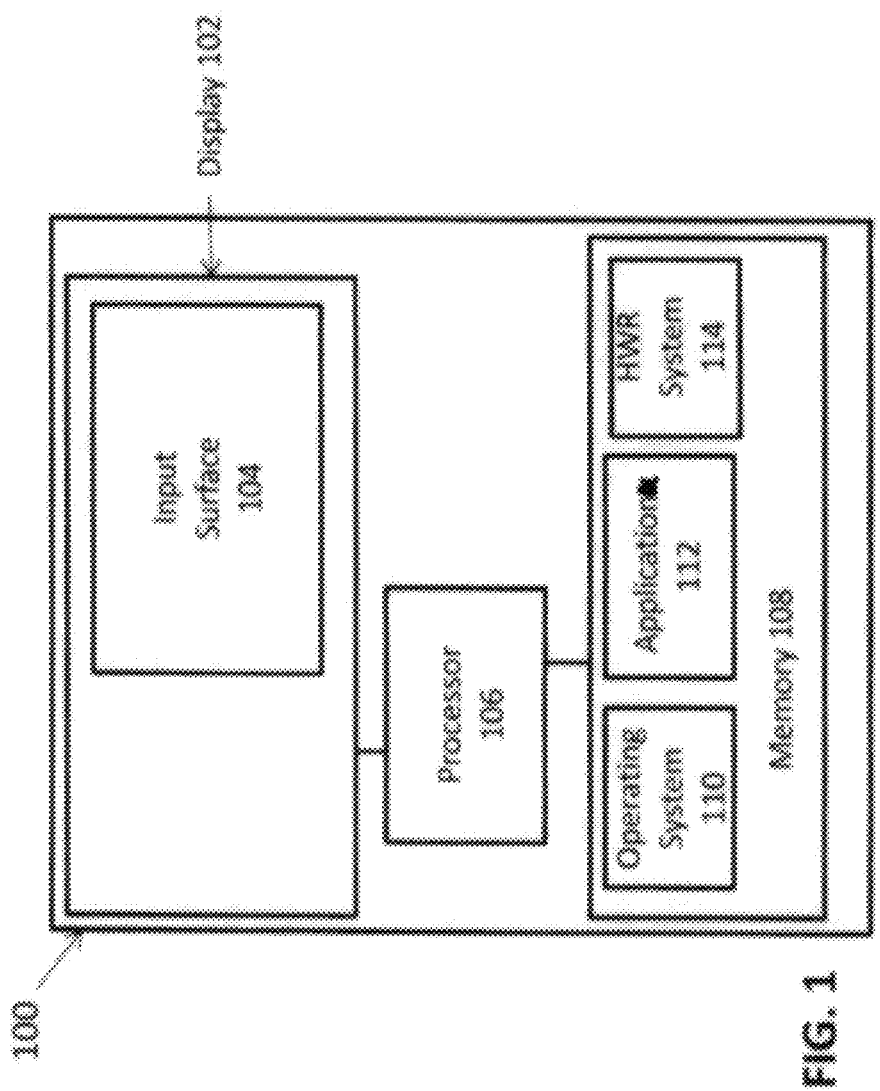
FIG. 1 shows a block diagram of a computing device in accordance with an example of the present system and method.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. The display 102 may be co-located with at least one input surface 104 or remotely connected thereto. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input in the form of a touch- or proximity-sensitive surface. The input surface 104 may be bounded by a permanent or video-generated border that clearly identifies its boundaries. The input surface 104 may a non-touch sensitive surface which is monitored by a position detection system.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 may include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of hand-drawn shapes and handwritten text input by users (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The present system and method make use of the HWR system 114 in order to recognize handwritten input to the device 100, including handwritten text and hand-drawn shapes, e.g., non-text. The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together accessing information processed and stored in the memory 108, for example, by each system, or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 2:
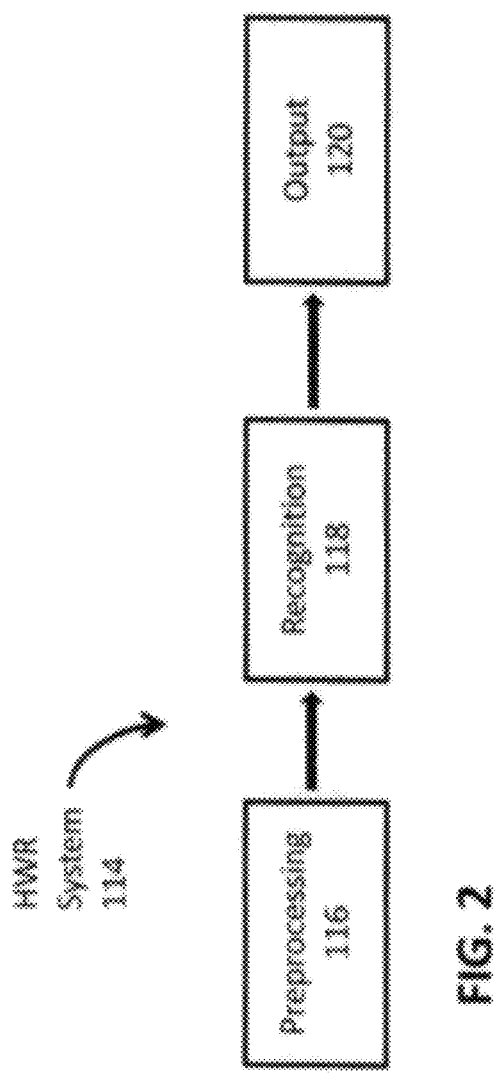
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as pre-processing 116, recognition 118 and output 120. The pre-processing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the memory 108 and the display 102 as a digital ink or typeset ink versions of the handwritten elements/characters and hand-drawn shapes.

Figure 3:
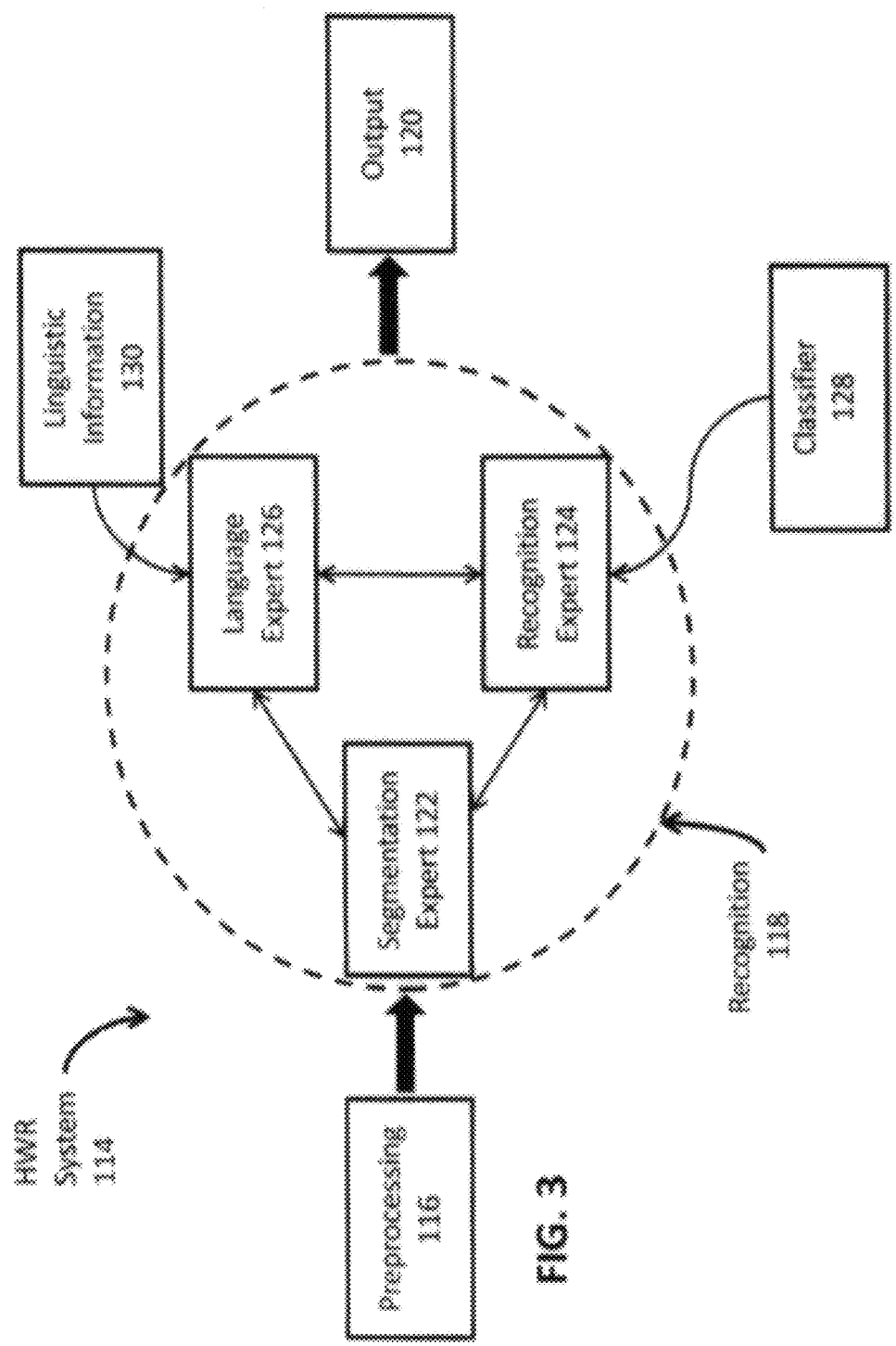
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon(s), regular expressions, etc. The language expert 126 aims at finding the best recognition path. In one example, the language expert 126 does this by exploring a language model such as final state automaton (determinist FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The application 112 provided by the present system and method allows users, such as students, academic and working professionals, to create handwritten diagrams and have those diagrams faithfully recognized using the HWR system 114 independent of the type of diagram created, e.g., flowcharts, organizational charts, concept maps, spider maps, block/architecture diagrams, mind-maps, block diagrams, Venn diagrams and pyramids. This list is not exhaustive and other types, or non-types, of diagrams are possible. For example, the different elements of the hand-drawn diagrams are individually recognized together with any spatial and context relationships there between without regard to the diagram type. As discussed earlier, these diagram elements include shape and text elements. Shape or drawing elements are those that define graphic or geometric formations in linear or non-linear configurations, and include containers, connectors and free-form drawings. Text elements are those that contain text characters and include text blocks and labels for the text blocks and shape elements. Both text blocks and labels may contain text of one or more characters, words, sentences or paragraphs provided in one or more vertical lines. Text blocks may be contained by containers (internal text blocks) or may be provided outside of containers (external text blocks). External text blocks may be unrelated to containers or other elements of a diagram or may be directly related to certain other diagram elements.

Further, the application 112 provided by the present system and method allows users to hand-draw what they have in mind (freely without being slowed by the technology) as they would on paper, while benefiting from the power of digital tools. Example uses include:

creation: high-level identification of, and differentiation between, shapes and text allows shapes to be sketched and text to be written by users without need to select or use pre-assigned tools when switching between drawing shapes and writing text, editing: identification of shape and text features enables the shapes to be manipulated for the change of connections or shape type, and the handling of editing gestures, typesetting: when creating diagrams users are provided with options for immediate recognition feedback.

These and other features of the present system and method and now described in detail.

Through the detection and differentiation of the input of the different handwritten objects of shapes and text, the application 112 directs processing of the different object types by the HWR system 114 with suitable recognition techniques, e.g., the strokes of the detected shapes are processed using a shape language model and the strokes of the detected text are processed using a text language model. This differentiation is used by the present system and method to provide live (that is, substantially real-time) recognition feedback to users as the different objects are hand-drawn. However, since many handwritten shapes and text characters can share common features (e.g., a circle and the letter "o", an arrowhead and the letter "v") this guidance also provides users with the ability to correct wrong differentiation decisions, described in detail later.

Through disambiguation handwritten input containing mixed content of text and non-text (i.e., shapes) is recognized and converted to beautified digital ink and typeset ink, either automatically (e.g., on-the-fly) or on demand. Digital ink is formed by rendering the handwritten input in digital image format. Beautified (digital) ink is formed by rendering the digital ink to appear more regular and normalized than the original handwriting while retaining similar styling or look-and-feel. Typeset ink is formed by converting the digital ink into typeset or fontified image format. Beautified typeset ink is formed by rendering the typeset ink with positional and styling changes from the input. The preprocessing stage 116 of the HWR system 114 is configured to perform the disambiguation process. The preprocessor 116 does this by classifying the elements of the digital ink into different classes or categories, being non-text (i.e., shape), text and a mixture of shape and text. This is done by using simple heuristics such as, for example, thresholds, writing speed, and time between strokes, or (alternatively or additionally) more complex heuristics such as, for example, grouping strokes for comparison to spatial and temporal thresholds and language model information, as described in European Patent Application No. 15290271.4 titled "System and Method of Handwriting Recognition in Diagrams" filed in the name of the present Applicant and Assignee and in United States patent application titled "System and Method of Handwriting Recognition in Diagrams" filed in the name of the present Applicant and Assignee contemporaneously with the present application, the entire contents of which are incorporated by reference herein. The disambiguation system and method can be performed on already input handwriting or incrementally as handwriting is input. The classified digital ink is then parsed to the recognizer 118 for suitable recognition processing depending on the classification.

For example, when processing digital ink classified as text, the recognizer 118 employs the segmentation expert 122 to segment individual strokes of the text to determine the segmentation graphs, the recognition expert 124 to assign probabilities to the graph nodes using the classifier 128, and the language expert 126 to find the best path through the graphs using, for example, a text-based lexicon of the linguistic information 130. On the other hand, when processing digital ink classified as non-text, the recognizer 118 employs the segmentation expert 122 to segment the strokes of the shape, the recognition expert 124 to determine segmentation graphs using the classifier 128, and the language expert 126 to find the best path through the graphs using a shape-based lexicon of the linguistic information 130. The mixed content classification is treated as 'junk' and will result in low probability of recognition when parsed to the recognizer 118. Shapes that are parsed to the recognizer and not recognized because, for example, they are out-of-lexicon shapes, are treated as doodles, being unrecognized content (described later).

In editing, handwritten operations such as overwrite, erasure and layout control, can be performed on both digital and typeset ink of non-text and text. For example, overwriting includes changing a shape from one type or form to another (e.g., switching a rectangle to an ellipse by hand-drawing an ellipse over a rectangle), adding decoration to a connector, and creating a shape around text. Erasure can be performed using known handwriting gestures, such as scratch-out or strike-out gestures on the shapes and text. Layout control can be performed to move and resize shapes, align and distribute shapes and text to each other or one another. The detection of at least some of these operations, as well as others, is enhanced by the disambiguation process.

With this classified hand-drawn input, the present system and method provides a mechanism for guiding users handwritten input, to optimize recognition and digital diagram creation. This mechanism can be further used to provide real-time recognition feedback to users, which does not distract from, but enhances, the input of handwriting. This is achieved by providing a guide element which includes a dynamic prompter. The prompter is used to dynamically display object class recognition, e.g., non-text or text, and, for shapes, an indication of the recognized shape and, for text, a certain number of last characters/symbols/words of recognized text as typeset ink. The guide element may further include a dynamic ruler configured to provide horizontal delimitation for handwriting and to dynamically grow as strokes are handwritten and/or typeset ink is rendered in the prompter. The guide element of the present system and method is now described with respect to an example hand-drawn diagram illustrated in FIGS. 4 to 31.

Figure 4:
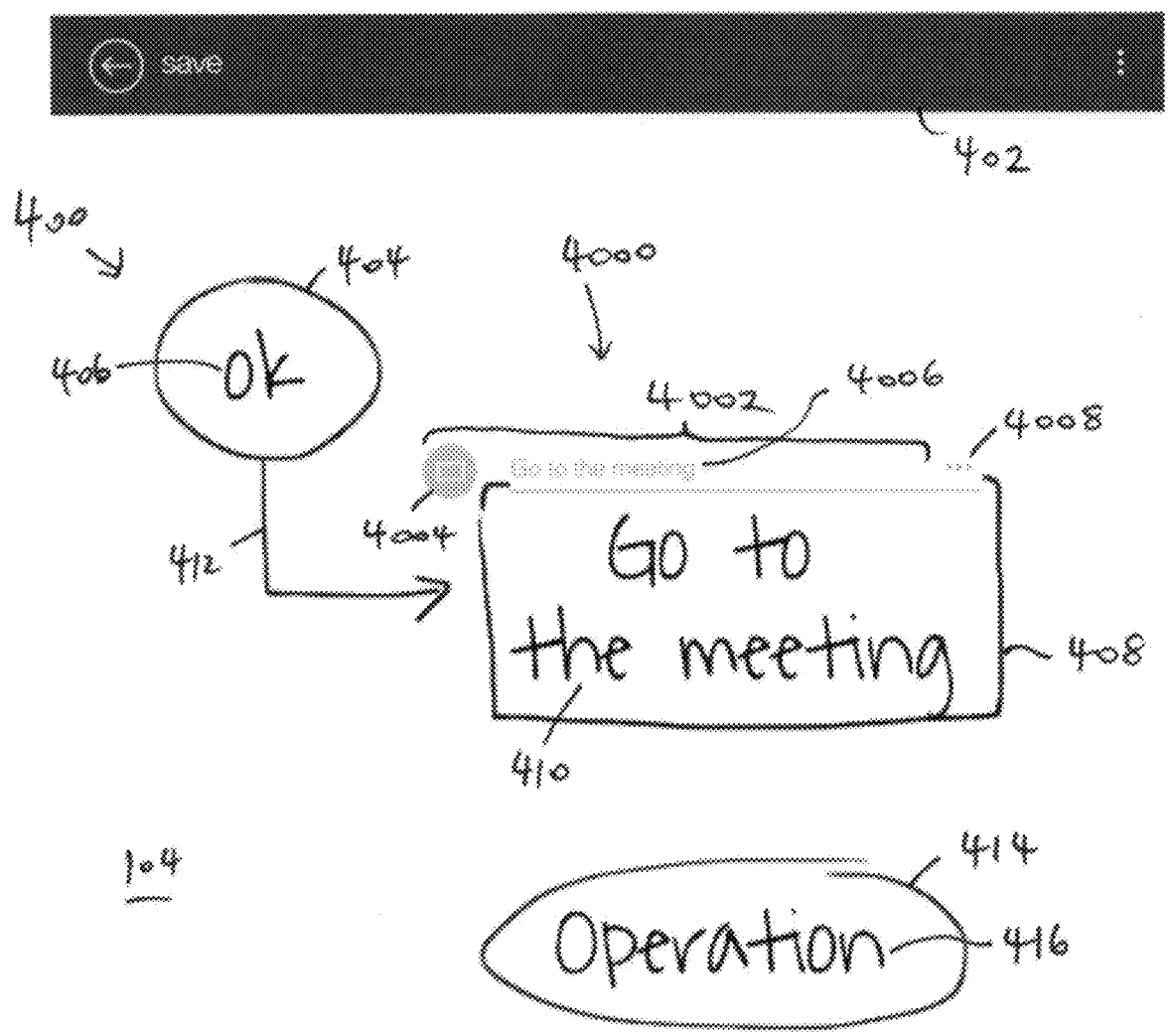
FIG. 4 shows an example hand-drawn diagram depicting a guide element.

FIG. 4 shows an example hand-drawn diagram 400 input via the UI 402 of the application 112 at the user interface 104 of the computing device 100, for example. The depiction of the UI 402, and any of its components, is merely an example, and other forms are possible. The diagram 400 is input including several diagram elements displayed by the application 112 as digital ink objects including a container 404 containing text 406, a container 408 containing text 410, a connector 412 connecting the containers 404 and 408, and a container 414 containing text 416. The content and element types are detected and recognized as described earlier, such that the application 112 handles the diagram elements based on their type, e.g., text, non-text and junk (or unrecognized non-text). A guide element 4000 is shown for the container 408 and contained text 410 displayed above and on the container 408 with slight overlap. This rendering and positioning of the guide element is merely an example, and different rendering and/or positioning is possible, with the constraints that display with minimal distracting appearance and effect on free handwriting entry in vicinity of the diagram elements(s) to which the guide element pertains is preferred, as described below.

The guide element 4000 is displayed with a prompter having guide components applicable to the detected and recognized content of the diagram element(s) to which it pertains and control components. For example, in FIG. 4, the guide element 4000 has a prompter 4002 including a shape component 4004 and a text component 4006, and control component 4008.

The shape component 4004 is displayed as an icon or label depicting a representation of the shape of the container 404 (e.g., a rectangle) recognized by the HWR system 114. However, a generic shape icon can also be displayed. In this way, without the need to convert the shape part or all of the digital ink diagram into typeset ink, such as through menu or gesture selection, users are provided with recognition feedback which informs them that the hand-drawn shape has been detected, and the type of shape has been recognized. Accordingly, the users are able to continue creation or editing of the diagram in digital ink without performing typesetting until desired.

The text component 4006 is displayed as a single horizontal line of typeset ink text recognized from the handwritten text 410 by the HWR system 114. In this way, without the need to convert the text part or all of the digital ink diagram into typeset ink, users are provided with recognition feedback which informs them that the handwritten text has been detected, and the content of the text has been recognized.

The control component 4008 is displayed as an interactive control element or "more" icon which provides access to control features of the application 112. In this way control elements are accessible much closer to the content than with the usual mechanisms, such as the top bar of the application.

In order to position the guide element close to the diagram elements to which it pertains, the present system and method may be made with respect to an alignment grid underlying the display interface, which grid may also be used to define one or more extents and positioning of the diagram elements themselves. FIGS. 5 to 28 show different display formats of the guide element 4000 in relation to examples of a sequence of handwritten input of the shapes and text of the diagram 400 and interactions performed on the guide element 4000.

Figure 5:
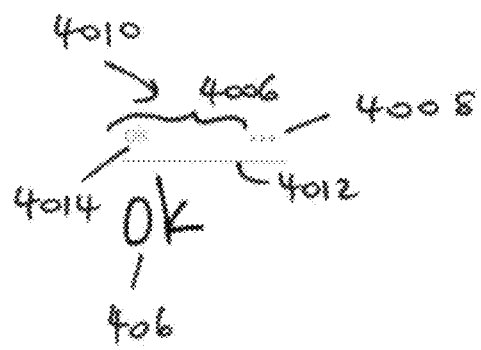
FIG. 5 shows input of a first hand-drawn text element of the example diagram with associated components of the guide element.

FIG. 5 shows input of the text element 406 as a first hand-drawn element of the diagram 400. Upon detection of the beginning of input and the rendering of the corresponding digital ink on the interface 104 the present system and method initiates display of the guide element 4000 as a text prompter 4010 which has a horizontal line or bar 4012 contiguous with and above the handwritten characters of the text 406 (as set by the alignment grid, for example), and the text component 4006 including typeset ink text 4014 recognized from the text 406 above the horizontal bar 4012, i.e., the word "Ok". The horizontal bar 4012 is configured to dynamically grow as text characters are input and recognized content is displayed in the text prompter 4010. This growth is limited however, and effects such as automatically scrolling to the left of the text prompter of already displayed recognized text may be made to ensure newly recognized content is displayed in the text prompter 4010.

Accordingly, substantially real-time content recognition feedback is provided during text input by the text prompter 4010. The control element 4008 is also displayed in the text prompter 4010 to the right of the text component 4006 and above the horizontal bar 4012. However, in order to not distract users during content input, the control icon may only be displayed when input is not being performed, e.g., during writing the 'more' icon is kept invisible and after writing, that is, at detection of ceasing of an input event, e.g., finger/pen up event, plus a predefined time period (e.g., about half a second to about a second) the 'more' icon is faded into full visibility.

Further, to not distract user input, the text prompter 4010 (and the 'more' icon 4008) is displayed with light and subtle rendering, e.g., in light blue or at least a different shade of the color used for the diagram element digital and/or typeset ink display, that is just between visible and faded. In this way the guide element is noticeable but unobtrusive so as to guide the handwriting input without distracting from the diagram creation itself. Further, the display of the guide element remains until different input is received by the application 112, or the end of a predefined time period (e.g., about half a second to about a second) after the input cessation event and during which no further input to the element the guide element pertains is detected, with fading of the guide element into invisibility.

Figure 6:
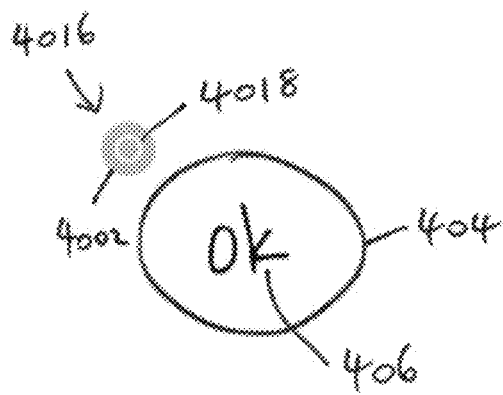
FIG. 6 shows subsequent input of a hand-drawn shape element of the example diagram with associated components of the guide element.

FIG. 6 shows the subsequent input of the shape element 404 drawn as a container containing the already input text 406. At this point, the shape element 404 may be identified as a container which contains the recognized word 406 due to the relative positions and characteristics of the inputs 404 and 406. A container and text contained thereby are associated with one another, so that some actions performed on one of these elements causes reactions on the other element. For example, when the container is selected and moved by the user the contained text is moved with the container, and when the text is selected and enlarged or added to by the user, the container is resized to accommodate the larger text size or block.

Upon detection of the beginning of input and the rendering of the corresponding digital ink on the interface 104 the present system and method, for example, omits display of the text prompter 4010 (along with the control element 4008) and initiates display of the guide element 4000 as a shape prompter 4016 above the hand-drawn shape 404 (as set by the alignment grid, for example) which has the shape component 4002 including a circle graphic 4018 recognized from the shape 404. Accordingly, substantially real-time content recognition feedback is provided at shape input. So as not to distract user input, the shape prompter 4016 is displayed with the same or similar light and subtle rendering as the text prompter 4010 and display is retained in a similar manner.

Figure 7:
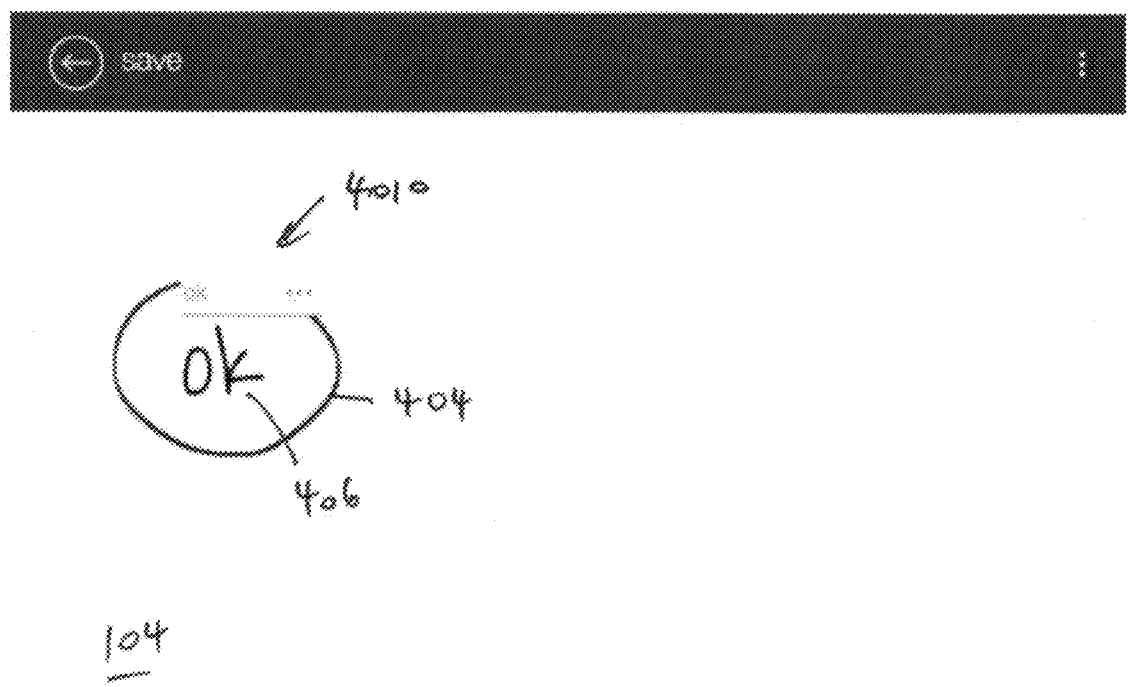
FIG. 7 shows the diagram state of FIG. 6 depicting selection of the text element with associated components of the guide element.

FIG. 7 shows the container 404 and contained text 406 of FIG. 6 but with the shape prompter 4016 omitted from display and the text prompter 4010 re-displayed so as to partially overlay the circle 404. This re-display is performed due to detection of a selection gesture on the digital ink text 406, such as a single-point gesture, e.g., a single tap, or a multi-point gesture, e.g., a double tap, by the application 112. Accordingly, users are able to interact with the hand-drawn content to ascertain the recognition status of the content, for example. The display of the guide element for selected content remains until new input, such as handwriting or a gesture, is received by the application 112, or for a predefined time period during which no interaction with the guide element or the content to which it pertains (e.g., about five seconds) is detected, with fading of the guide element into invisibility.

Figure 8:
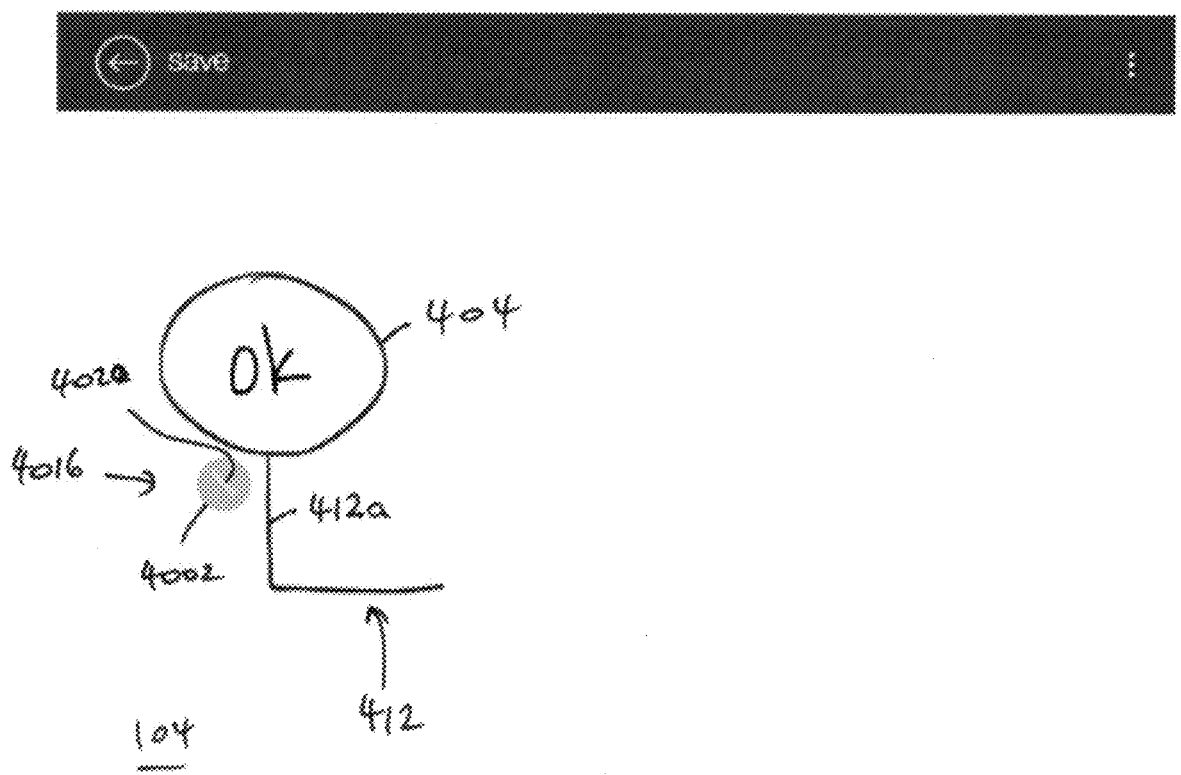
FIG. 8 shows subsequent input of a hand-drawn shape element of the example diagram associated with the text element of FIG. 7 with associated components of the guide element.

FIG. 8 shows the subsequent input of a portion 412*a* of the shape element 412 drawn as a bent line below the circle 404. The shape element 412 is an arrow, as seen in FIG. 4, which is defined as being formed by a straight or bent 'stem' terminating in one or two open- (e.g., v-shaped) or closed- (e.g., triangular) 'arrowheads'. The portion 412*a* constitutes the stem of the arrow 412. Upon detection of the beginning of input and the rendering of the corresponding digital ink on the interface 104 the present system and method initiates display of the guide element 4000 as the shape prompter 4016 beside the hand-drawn shape 412*a* (as set by the alignment grid, for example) which has the shape component 4002 including a line graphic 4020 recognized from the shape 412*a*, i.e., a line. It is noted that the line graphic shown in FIG. 8 is a generic line; however the graphic may be a bent line in this example like the recognized bent line 412*a*.

At this point, the line 412*a* may be identified as a connector of the circle 404 due to their relative positions (e.g., a pre-set spatial separation threshold is used by the application 112, where separation of an end of a linear shape to the non-linear shape below that threshold indicates a high likelihood of a connection relationship; the spatial threshold may be defined as a distance in pixels between mean points or barycenters of the strokes, for example, set to be about five pixels to about 100 pixels) and/or characteristics of the inputs 404 and 412*a* (e.g., a line having one end proximate or adjoining a container indicates a high likelihood of a connection relationship; with proximity defined in a distance range similar to the spatial threshold). A shape object, such as a container, and a connector connected thereto are associated with one another so that some actions performed on one of these elements causes reactions on the other element. For example, when the container is selected and moved by the user the connector is moved with the container.

Figure 9:
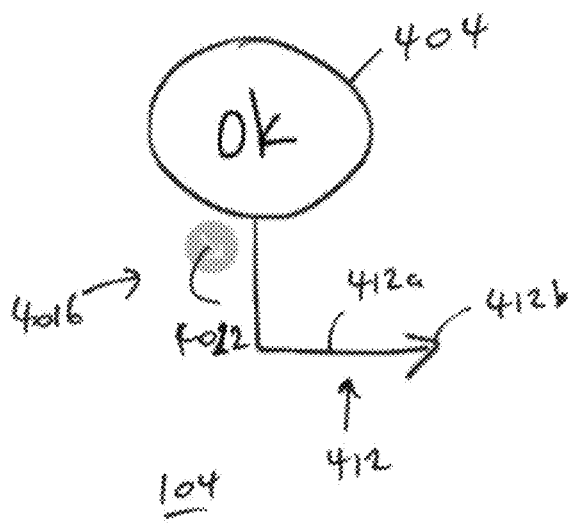
FIG. 9 shows subsequent input of a hand-drawn shape element of the example diagram with associated components of the guide element.

FIG. 9 shows the subsequent input of a portion 412*b* of the shape element 412 drawn as a rotated v-shape at the end of the line 412*a* which is not proximate the circle 404. The portion 412*b* constitutes the arrowhead of the arrow 412. Upon detection and recognition of the portion 412*b* as the arrowhead of the arrow 412 made up of the bent line 412*a* and the arrowhead 412*b*, the recognized shape graphic of the shape prompter 4016 is changed to an arrow graphic 4022, without repositioning of the shape prompter 4016, however repositioning is possible. It is noted that the graphic shown in FIG. 9 is a generic arrow; however the graphic may be a bent arrow in this example like the recognized bent arrow 412.

The determination of the later drawn shape 412*b* and the earlier drawn shape 412*a* as belonging to the single shape 412 is made by the application 112 based on a probability score. That is, the strokes 412*a* and 412*b* of the arrow 412 are drawn within a relatively long space of time, say, more than one second (e.g., greater than a pre-set, and re-settable, temporal separation threshold used by the application 112, where the time separation between drawing strokes below that threshold indicates a high likelihood of the strokes being parts of a single shape), such that the stroke 412*a* is parsed to the recognizer 118 alone and recognized as a bent line, as described with respect to FIG. 9. The proper identification of the complete connector arrow 412 is provided however through the overall probability score calculated from spatial and temporal scores and metrics or characteristics of the input strokes. That is, while the temporal score for the strokes 412a and 412b being part of the same object is low, the combination of the high spatial score for the strokes 412a and 412b being part of the same object, as returned through the grouping performed by the disambiguation system and method and the characteristics (e.g., a rotated v-shape at the end of a line) result in the overall probability of the strokes 412a and 412b belonging to one shape being high. This determination of an arrowhead added to the line 412a can be used to affirm the connector status of the shape element 412, if arrows are classed by the application 112 as having high likelihood of being connectors, for example.

Figure 10:
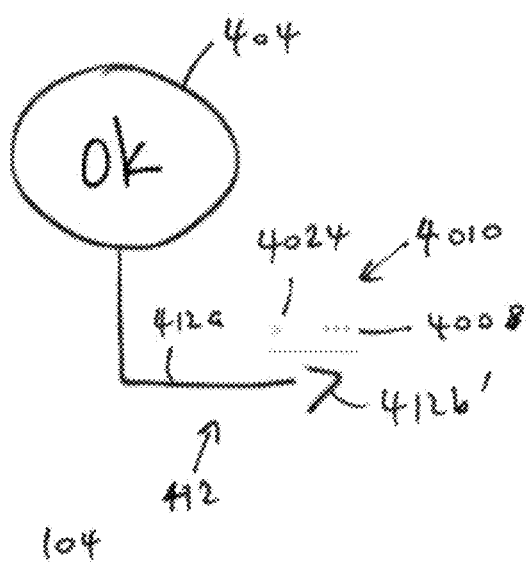
FIG. 10 shows alternative subsequent input (to the input of FIG. 9) of a hand-drawn element of the example diagram with associated components of the guide element.

FIG. 10 shows an alternative input of a portion 412b' of the shape element 412 drawn as a rotated v-shape like the portion 412b shown in FIG. 9 but drawn at a distance from the end of the line 412a unlike the portion 412b shown in FIG. 9. At the rendering of the digital ink, display of the guide element 4000 as the text prompter 4010 is made with the text component 4006 including typeset ink text 4024 recognized from the portion 412b', i.e., the symbol ">". The portion 412b' is recognized as text instead of as part of the shape 412, due to the relatively large distance between the portion 412a and the portion 412b' resulting in a higher probability score that the input 412b' belongs to a separate object, and therefore the disambiguation system and method is able to classify the portion 412b' as text, instead of non-text. The present system and method however provides users with the ability to change this recognition result, as follows.

Figure 11:
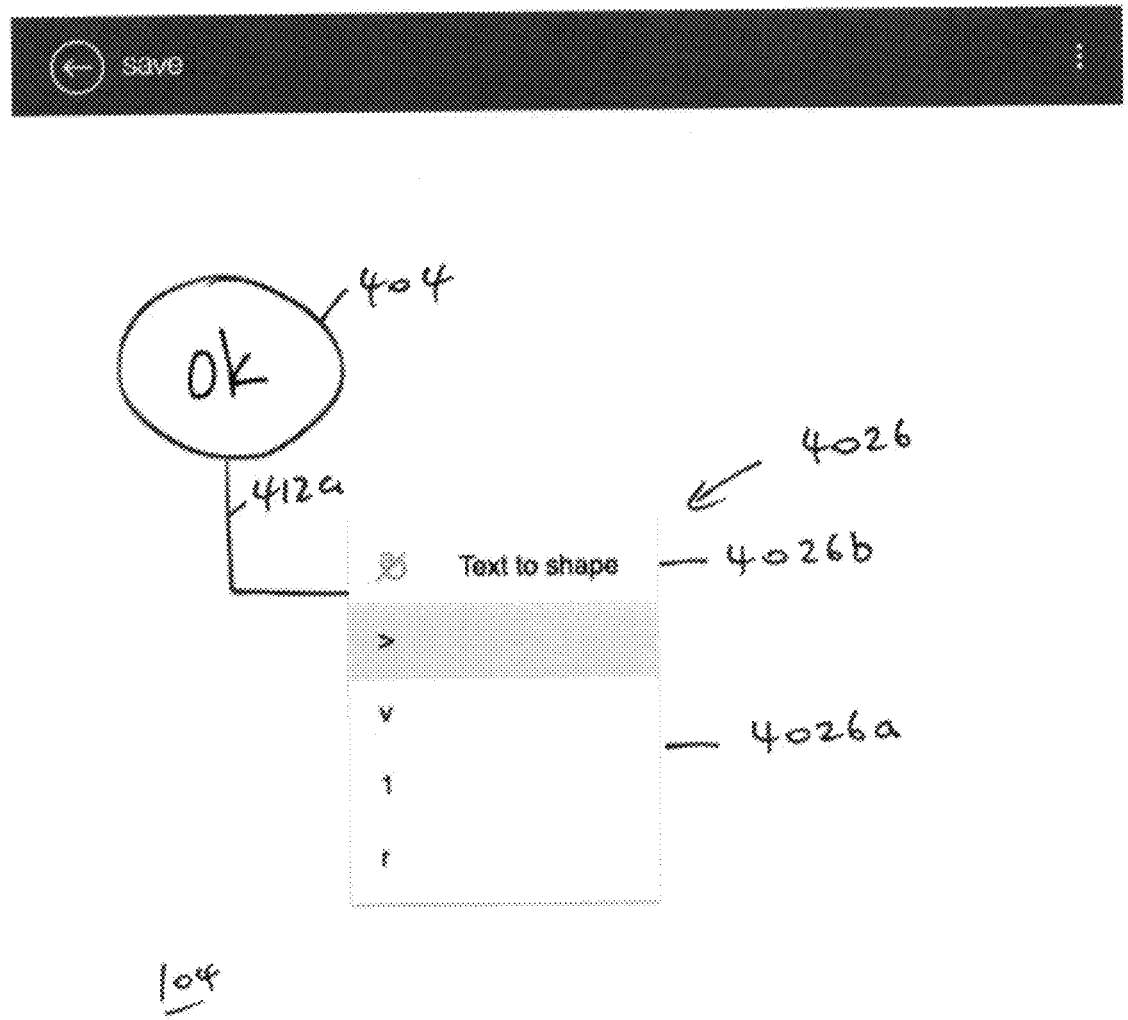
FIG. 11 shows the diagram state of FIG. 10 depicting menu display from selection of a component of the guide element for the element.

Each of the shape, text and control components of the guide element 4000 are interactive in either the concurrent display (i.e., as in FIG. 10) or post-display (i.e., as in FIG. 7) modes of the guide element 4000. This interactivity can be accessed through selection with the detection of a selection gesture on a component, such as a single-point gesture, e.g., a single tap or long press, by the application 112, resulting in assigned actions for that component with respect to the display mode of the guide element, e.g., concurrent or post. Accordingly, users are able to interact with the hand-drawn content to ascertain the recognition status of the content, for example. FIG. 11 shows the input stage of FIG. 10 with a menu 4026 displayed in response to detection of a selection gesture on the recognized text 4024 in the text prompter 4010. The text menu 4026 has two display zones 4026a and 4026b.

In the menu zone 4026a, a list of text recognition candidates is displayed. These candidates are the most likely recognition candidates output by the HWR system 114 with respect to the recognition process for the portion 412b'. In FIG. 11, the four best candidates are shown, however more or less than these can be displayed. Each of the displayed candidates in the zone 4026a are individually interactive through selection with the detection of a selection gesture on a candidate, such as a single-point gesture, e.g., a single tap or long press, by the application 112, resulting in the recognized text 4024 in the text prompter 4010 being changed to the selected candidate, and the selected candidate to be displayed when the portion 412b' is typeset. In the menu zone 4026b, a manual classification action is displayed, which for the text menu is "Text to shape". This action of the zone 4026b is similarly interactive, with selection causing the recognized text 412b' to be re-classified as non-text with consequential re-recognition being performed. In this process, the disambiguation system and method re-evaluates the now classified shape 412b' with other already classified proximate shape elements, i.e., the line 412a, to determine if groupings of the shape 412b' with those other shape elements result in a probability of the shape 412b' being part of a greater shape element, i.e., the shape element 412, for consequential recognition by the recognizer 118. The displayed actions are only an example, and more, less or different actions may be displayed.

Figure 12:
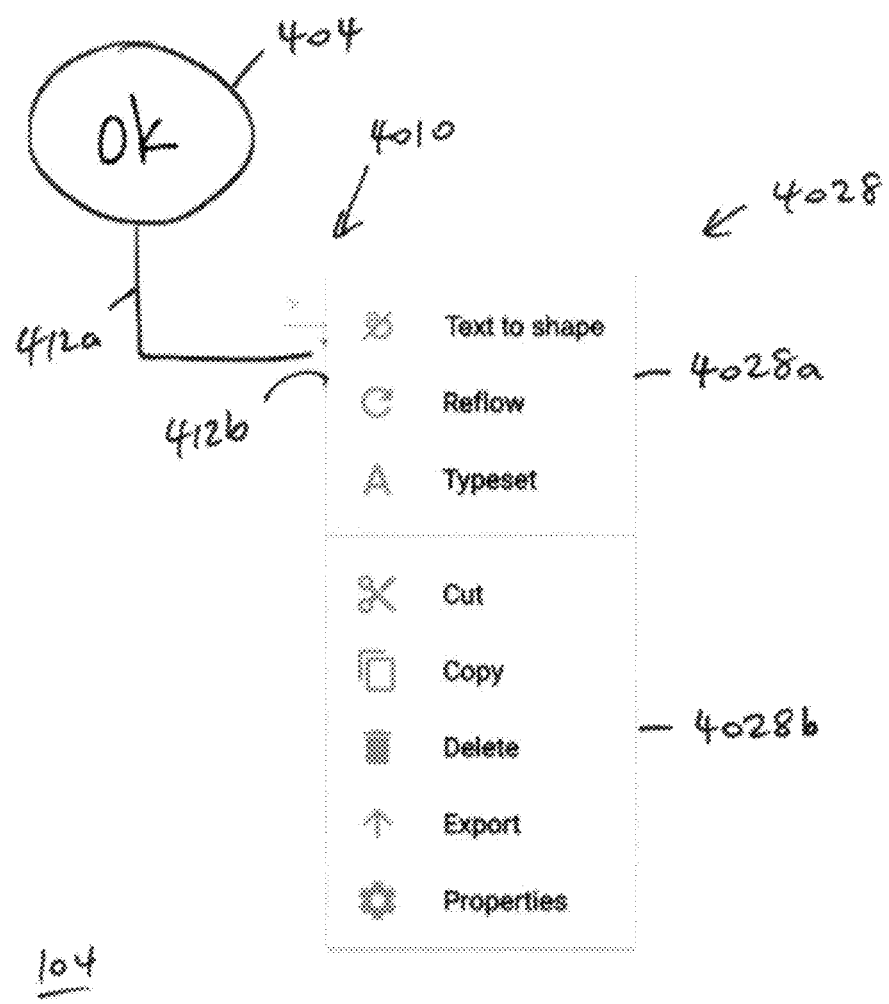
FIG. 12 shows the diagram state of FIG. 10 depicting another menu display from selection of another component of the guide element for the element.

FIG. 12 shows the input stage of FIG. 10 with a different menu 4028 displayed in response to detection of a selection gesture on the 'more' icon 4008 in the text prompter 4010. The text control menu 4028 has two display zones 4028a and 4028b. In the menu zone 4028a, actions related to the content transform are displayed, which for the text control menu is the "Text to shape" action, a "Reflow" action and a "Typeset" action. These actions of the zone 4028b are individually interactive, with selection of the "Text to shape" action causing manual re-classification as described above, of the "Reflow" action causing, for the text control menu 4028, reflow of the digital or typeset ink text within or onto multiple lines, and of the "Typeset" action causing, for the text control menu 4028, typesetting of the displayed digital ink text. In the menu zone 4028b, interactive actions related to standard operations are displayed, which for the text control menu are cut, copy, delete, export and properties/settings. These displayed actions are only an example, and more, less or different (with the exception of manual reclassification) actions may be displayed.

FIG. 13 shows the connector 412 of FIG. 6 but with the shape prompter 4016 omitted from display and a connector prompter 4030 of the guide element 4000 in proximity of the connector 412 (as set by the alignment grid, for example). The connector prompter is displayed due to detection of a selection gesture on the connector 412, such as a single-point gesture, e.g., a single tap or long press, by the application 112. The selected connector 412 is displayed in selection mode rendering which includes the typeset version of the shape overlaid on the digital ink, with the rendering of the digital ink de-emphasized (e.g., displayed lighter) and the typeset ink emphasized (e.g., displayed in a color and/or ink weight greater than that of the normal ink display), and selection handles A, for resizing of the connector. The connector prompter 4030 has a connector component 4032 including the arrow graphic 4022 recognized from the shape 412. The control element 4008 is also displayed in the connector prompter 4030 to the right of the connector component 4032 and above a horizontal bar 4012.

As the connector prompter is displayed in response to user interaction with a connector, the connector prompter 4030 is displayed with bolder rendering than the shape and text prompters, since interaction with the connector prompter is likely expected. The display of the connector prompter remains until de-selection of the selected connector is detected, or the end of a predefined time period during which no interaction with the connector prompter or the content to which it pertains (e.g., about five seconds) is detected, or different input is received by the application 112, with fading of the guide element into invisibility.

Figure 14:
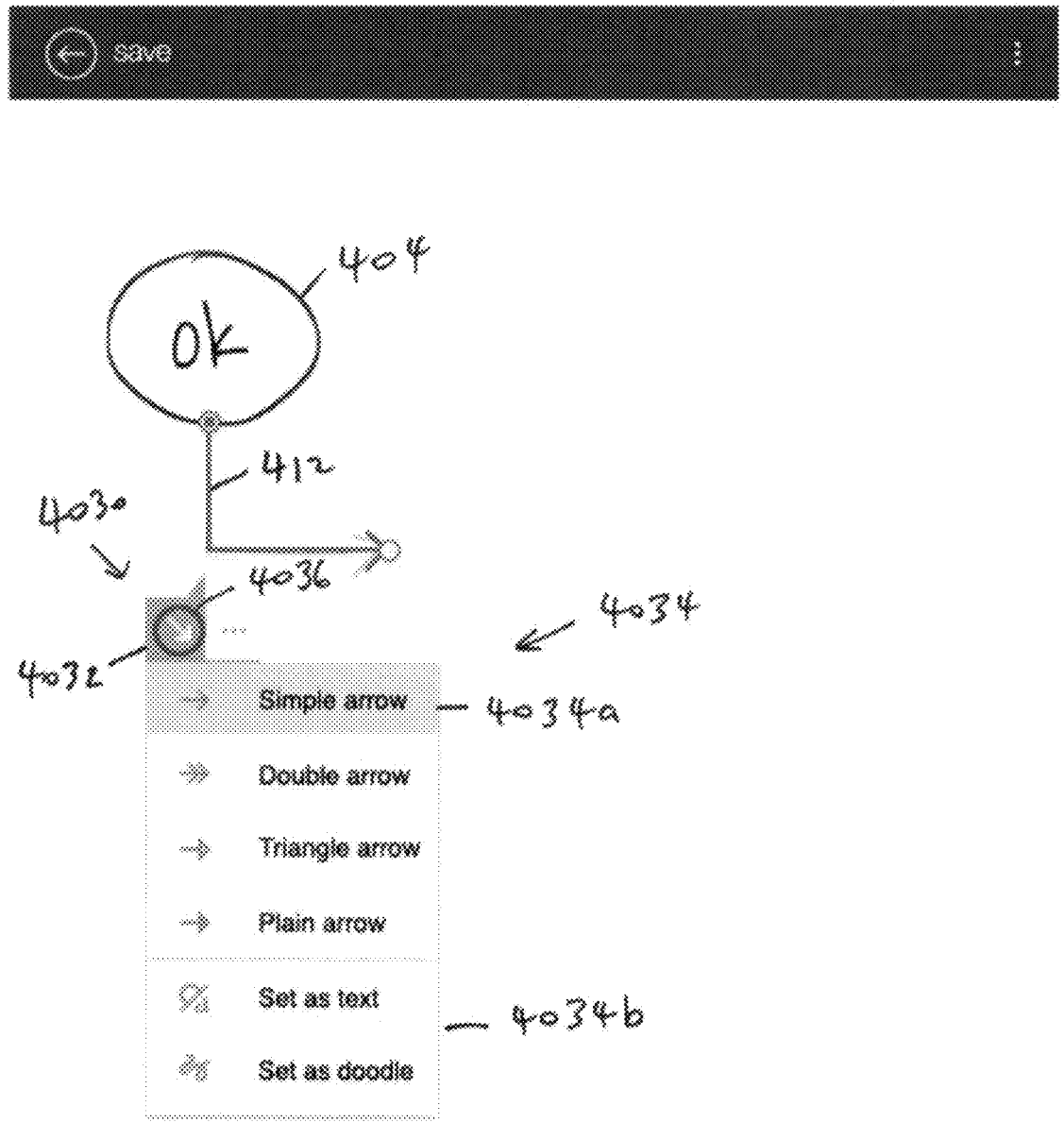
FIG. 14 shows the diagram state of FIG. 13 depicting menu display from selection of a component of the guide element for the combined shape elements.

As with the text prompter, the connector prompter is interactive. FIG. 14 shows the input stage of FIG. 13 with a menu 4034 displayed in response to detection of a selection gesture 4036 on the connector icon 4032 in the connector prompter 4030. The connector menu 4034 has two display zones 4034a and 4034b. In the menu zone 4034a, a list of alternative connector arrow types are displayed which are individually interactive. These alternatives are displayed based on the type of connector being interacted with, in this example an arrow. For the line connector of FIG. 8 a different list of alternative connector types are shown in the connector menu. In the menu zone 4034b, actions which are individually interactive and related to the content transform are displayed, which for the connector menu include a "Set as text" action and a "Set as doodle" action, with selection of the "Set as text" action causing manual re-classification as described above, and of the "Set as doodle" action causing the recognition of the shape 412 as a connector to be changed to doodle, thereby removing the connector status of the reclassified doodle with the above-described consequential effect on the digital ink rendering even after typesetting of the diagram 400. These displayed actions are only an example, and more, less or different actions may be displayed.

Figure 15:
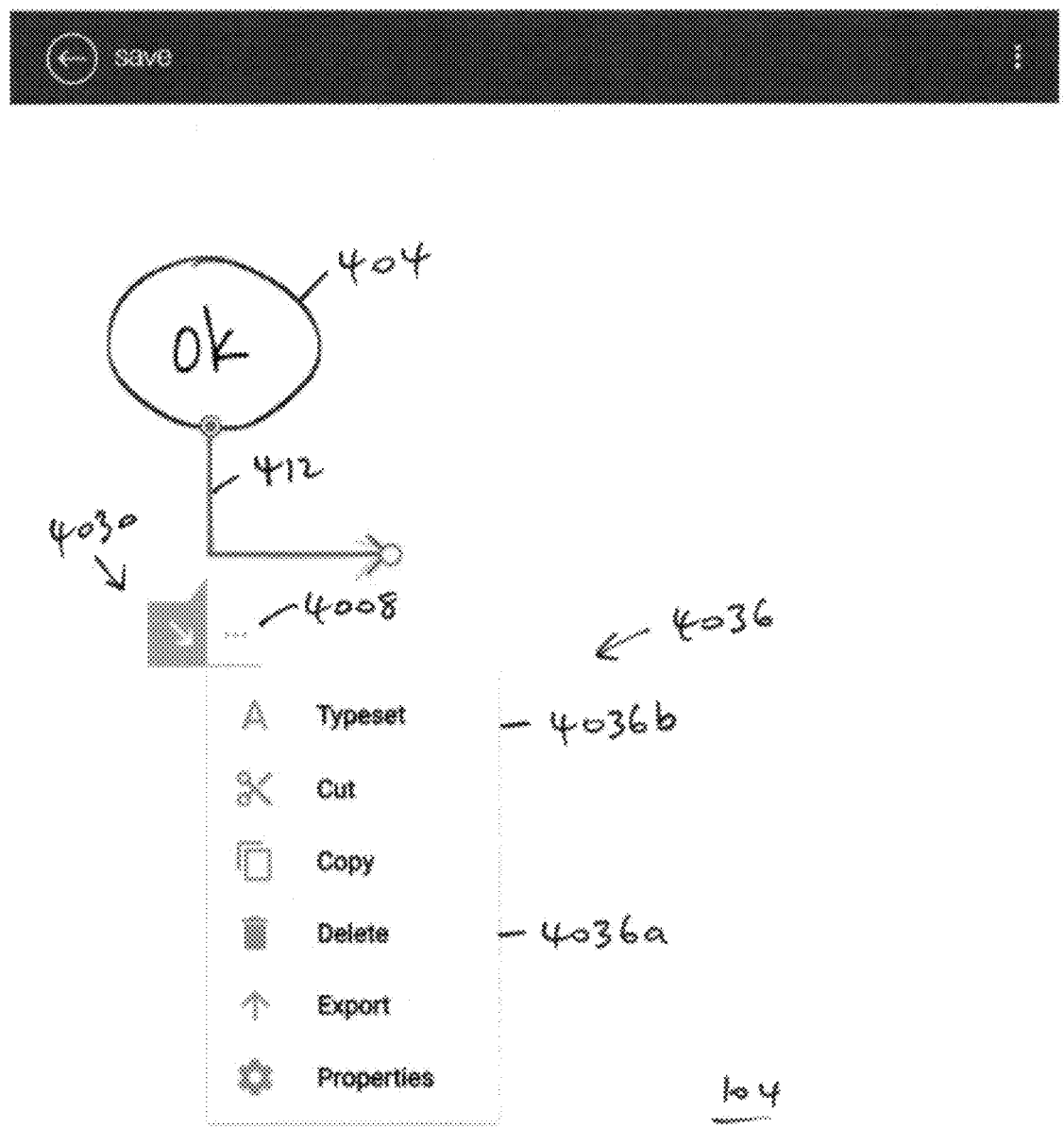
FIG. 15 shows the diagram state of FIG. 13 depicting another menu display from selection of another component of the guide element for the combined shape elements.

FIG. 15 shows the input stage of FIG. 13 with a menu 4036 displayed in response to detection of a selection gesture on the 'more' icon 4008 in the connector prompter 4030. The connector menu 4036 has two display zones 4036a and 4036b. In the menu zone 4036a, the interactive actions related to standard operations discussed above are displayed. In the menu zone 4036b, the "Typeset" content transform action is displayed. These displayed actions are only an example, and more, less or different actions may be displayed.

Figure 16:
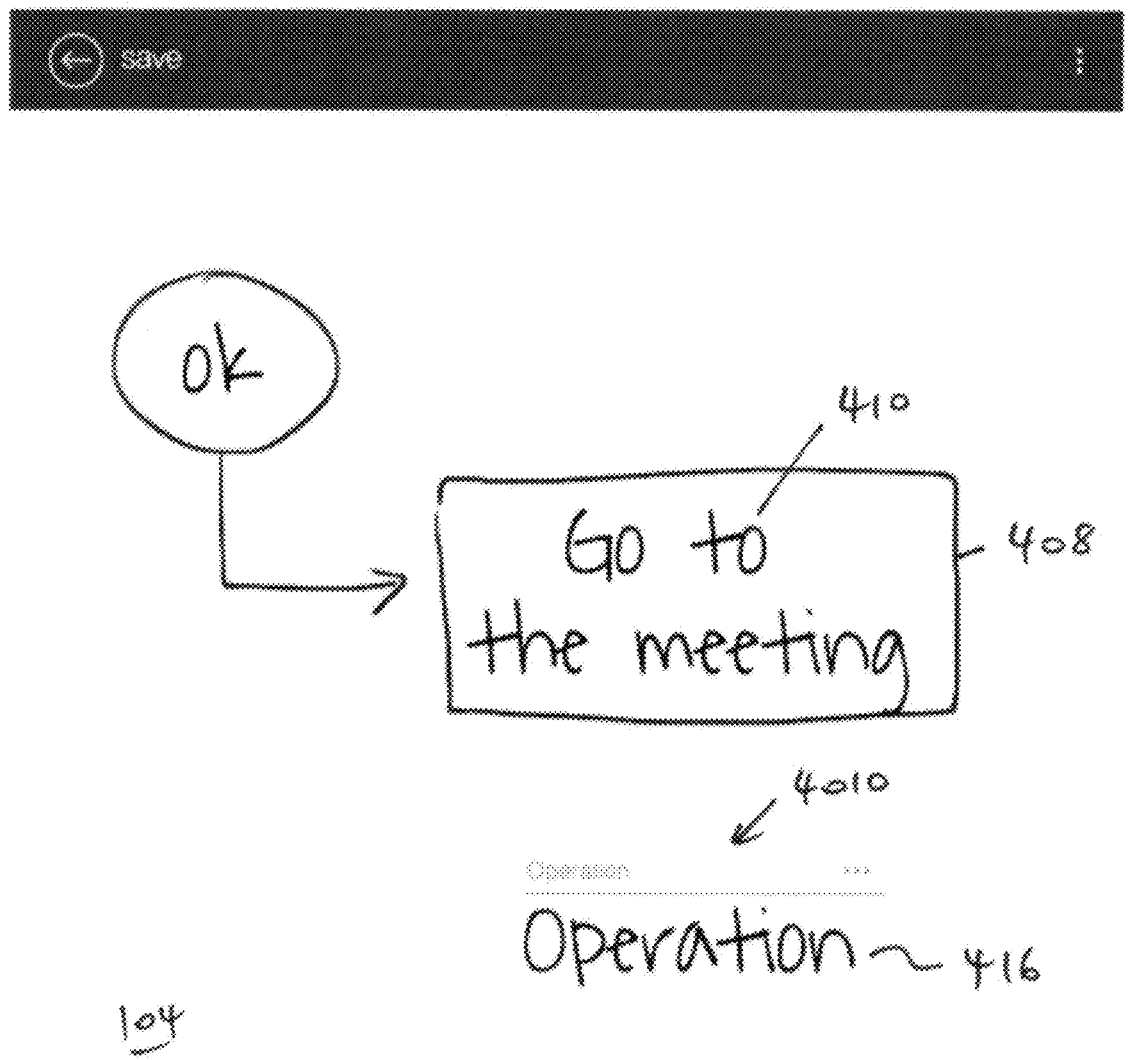
FIG. 16 shows input of a further hand-drawn text element of the example diagram with associated components of the guide element.

FIG. 16 shows the diagram 400 after subsequent input of the container 408 and contained text 410 and with the subsequent input of the text element 416. Upon detection of the beginning of input and the rendering of the corresponding digital ink on the interface 104 the present system and method initiates display of the guide element 4000 as the text prompter 4010 having the text component 4006 including the typeset ink word 4014 recognized from the text 416 above the horizontal bar 4012, i.e., the word "Operation".

Figure 17:
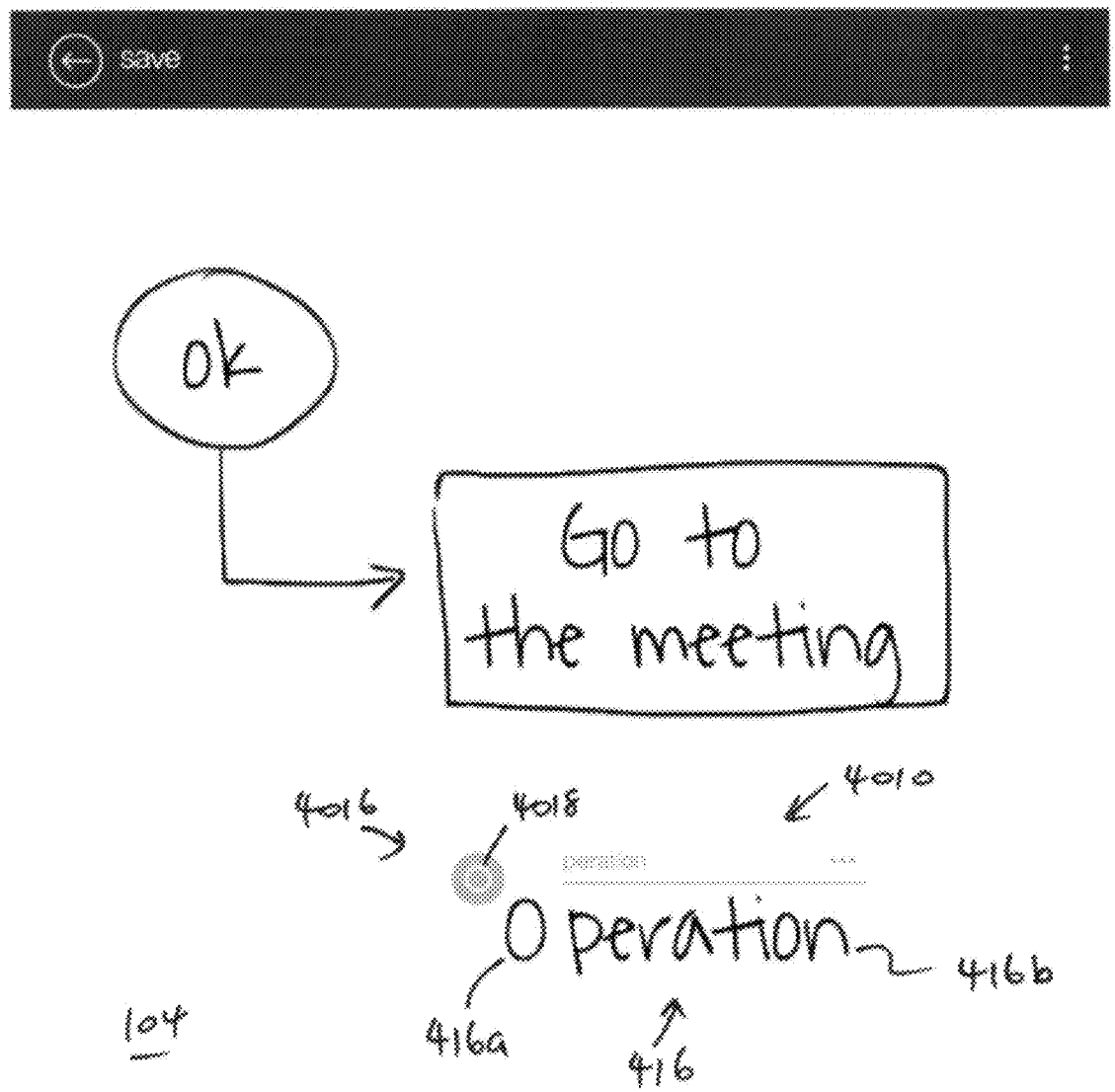
FIG. 17 shows alternative input (to the input of FIG. 16) of further hand-drawn shape and text elements of the example diagram with associated components of the guide element.

FIG. 17 shows an alternative input of the text element 416 having a portion 416a, the letter "O", and a portion 416b, the letters "peration" which are written at a distance from one another. At the rendering of the digital ink, display of the guide element 4000 as both the shape prompter 4016 above the portion 416a and the text prompter 4010 above the portion 416b is made. This is because the portion 416a is recognized as a shape, namely a circle with display of the circle graphic 4018, instead of text, and the portion 412b' is properly recognized as text. This is due to the relatively large distance between the portions 416a and 416b resulting in a higher probability score that the inputs 412b and 416b belong to separate objects, and therefore the disambiguation system and method is able to classify the portion 416a as non-text, instead of text. As before, this recognition result can be changed through interaction with the shape prompter 4016 to launch a menu.

FIG. 18 shows the input stage of FIG. 17 with a menu 4038 displayed in response to detection of a selection gesture on the shape component 4004 in the shape prompter 4016. The shape menu 4038 has two display zones 4038a and 4038b. In the menu zone 4038a, a list of shape recognition candidates are displayed. These candidates are the most likely recognition candidates output by the HWR system 114 with respect to the recognition process for the portion 416a. In FIG. 18, the four best candidates are shown, however more or less than these can be displayed. Each of the displayed candidates in the zone 4038a are individually interactive through selection with the detection of a selection gesture on a candidate, such as a single-point gesture, e.g., a single tap or long press, by the application 112, resulting in the shape graphic 4018 in the shape prompter 4016 being changed to the selected candidate, and the selected candidate to be displayed when the portion 416a is typeset. In the menu zone 4038b, a manual classification action is displayed, which for the shape menu is "Shape to text". This action of the zone 4038b is similarly interactive, with selection causing the recognized shape 416a to be re-classified as text with consequential re-recognition being performed. In this process, the disambiguation system and method re-evaluates the now classified text 416a with other already classified proximate text elements, i.e., the text 416b, to determine if groupings of the text 416a with those other text elements result in a probability of the text 416a being part of a greater text element, i.e., the text element 416, for consequential recognition by the recognizer 118. The displayed actions are only an example, and more, less or different actions may be displayed.

Figure 19:
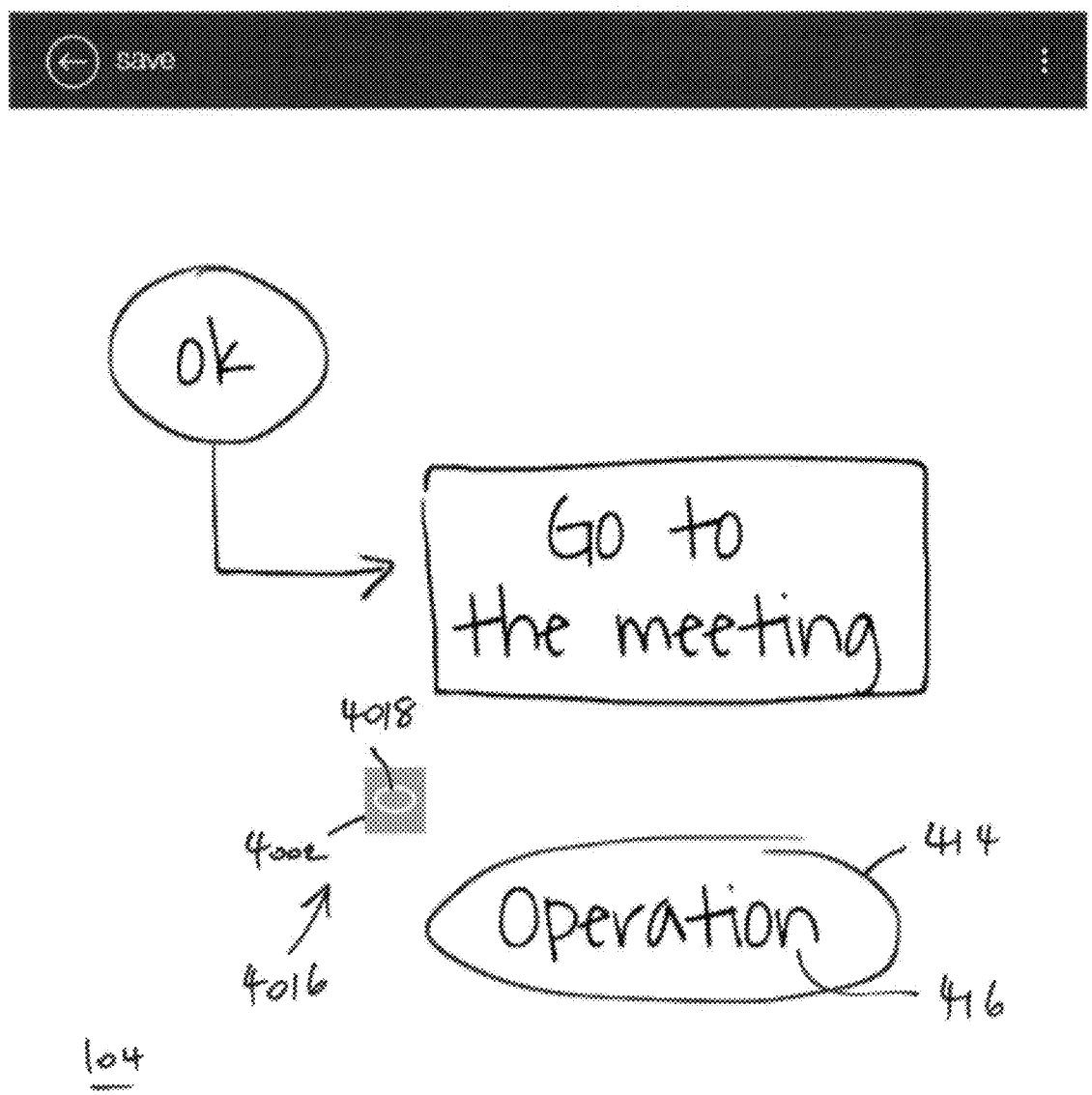
FIG. 19 shows subsequent input of a hand-drawn shape element of the example diagram with associated components of the guide element.

FIG. 19 shows the subsequent input of the shape element 414 (from the input of FIG. 16) as the last element of the diagram 400 drawn as a container containing the already input text 416. At this point, the shape element 414 may be identified as a container which contains the recognized word 416 due to the relative positions and characteristics of the inputs 414 and 416. Upon detection of the beginning of input and the rendering of the corresponding digital ink on the interface 104 the present system and method, for example, omits display of the text prompter 4010 and initiates display of the guide element 4000 as the shape prompter 4016 above the hand-drawn shape 414 (as set by the alignment grid, for example) which has the shape component 4002 including an ellipse graphic 4018 recognized from the shape 414.

Figure 20:
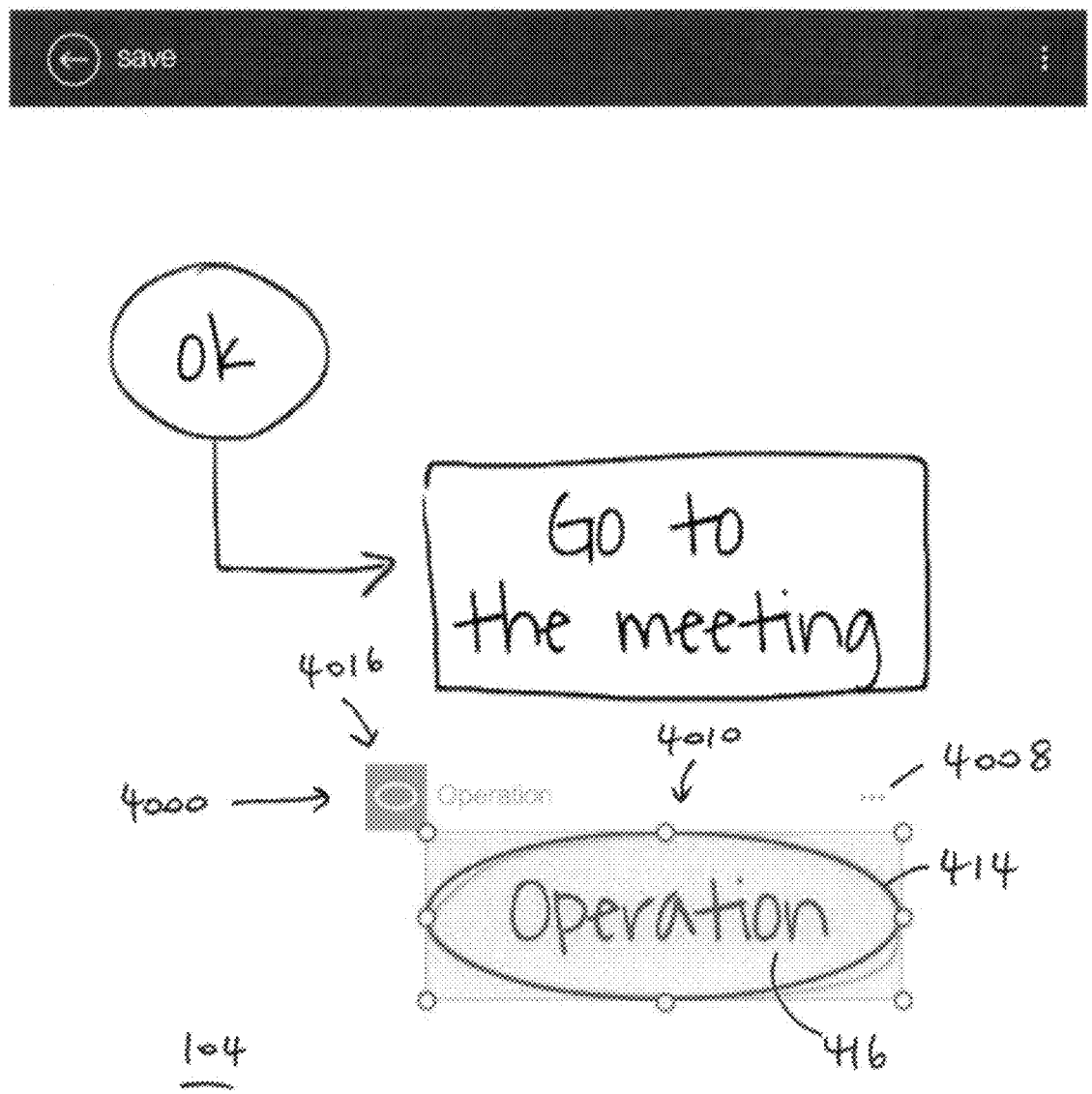
FIG. 20 shows the diagram state of FIG. 19 depicting selection of the shape and text element inputs of FIGS. 16 and 19 with associated components of the guide element.

FIG. 20 shows the container 414 and contained text 416 of FIG. 19 but with these elements displayed in the afore-described selection mode rendering which includes the selected typeset version of the shape and a selected digital ink version of the text (however the text could be rendered in selected typeset as well) due to detection of a selection gesture on the container 414, for example. In response, the full guide element 4000 of the shape prompter 4016, the text prompter 4010 and control element 4008 is displayed, so that the entire selected diagram element of the container and contained text can be interacted with via the 'more' icon, or the shape and text elements can be individually interacted with via the respective prompters.

Figure 21A:
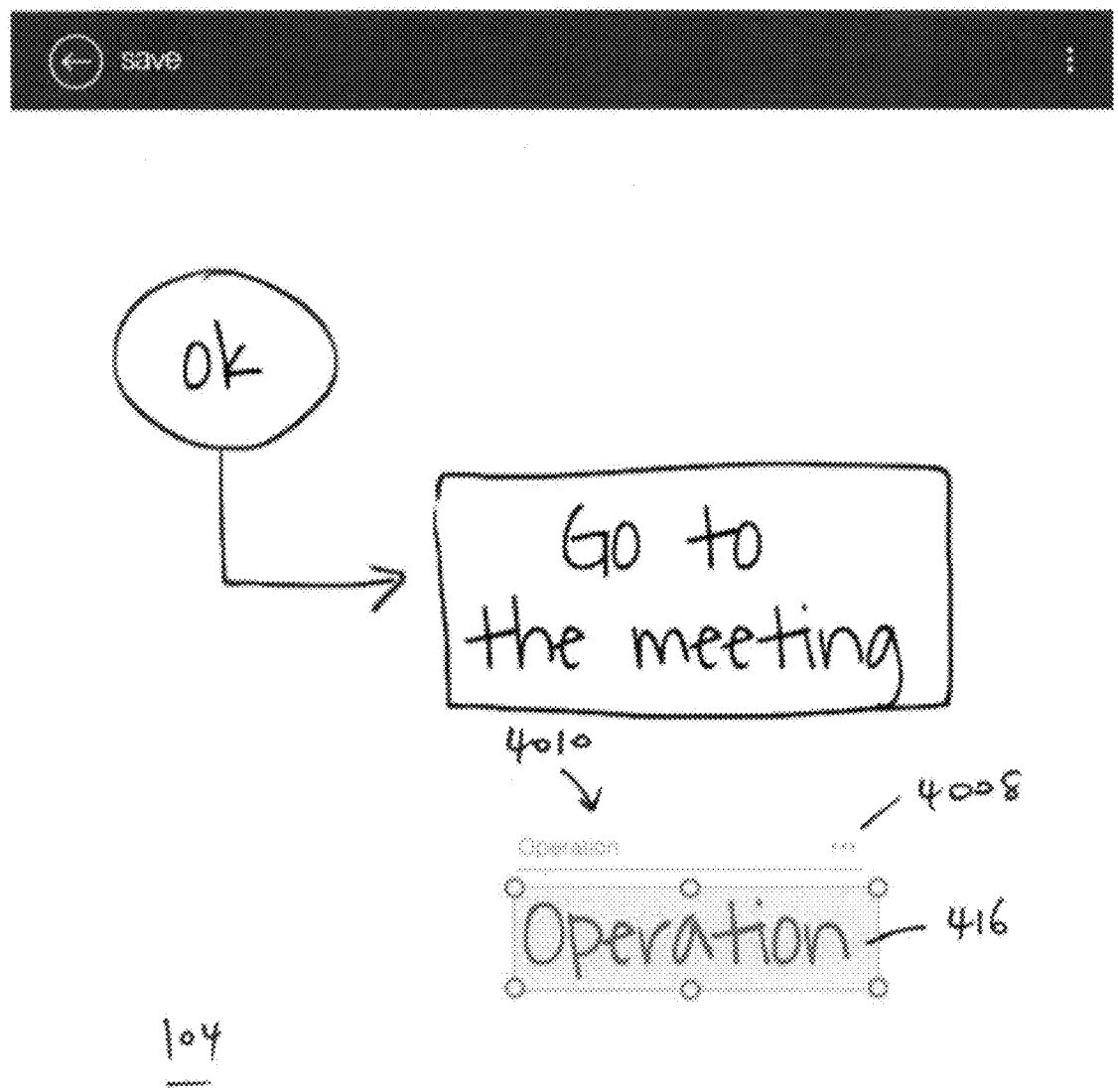
FIG. 21A shows the diagram state of FIG. 16 depicting selection of the text element input of FIG. 16 with associated components of the guide element.
Figure 21B:
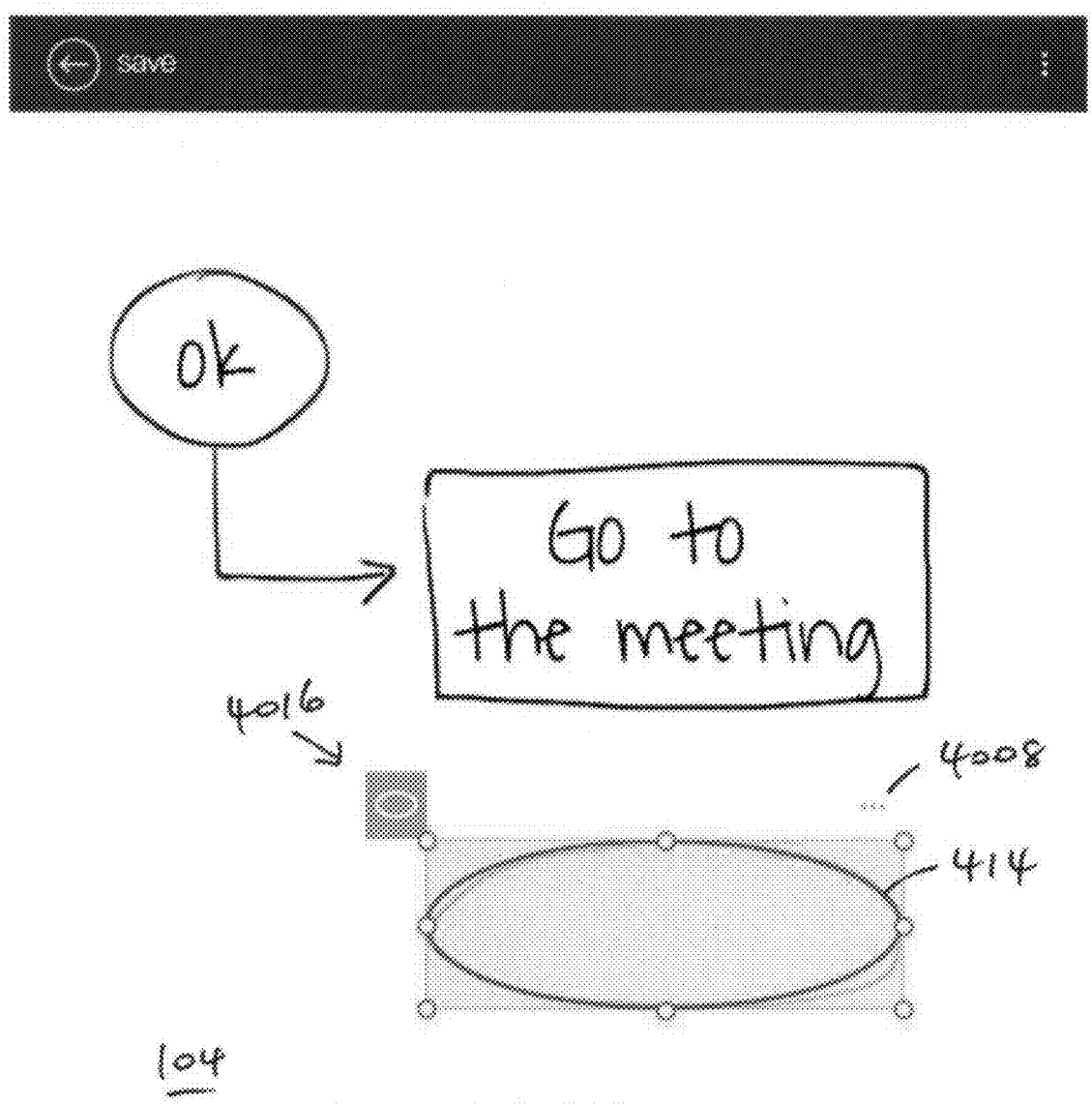
FIG. 21B shows alternative input (to the inputs of FIGS. 16 and 19) of a hand-drawn shape element of the example diagram depicting selection of that shape element with associated components of the guide element.

FIGS. 21A and 21B illustrate alternative scenarios of this selection in which the text element 416 and the shape element 414 respectively have been input separately and alone. In such a case, the selection of the lone elements causes selection mode display of that element and display of the corresponding guide element prompter (with the control element).

Figure 22:
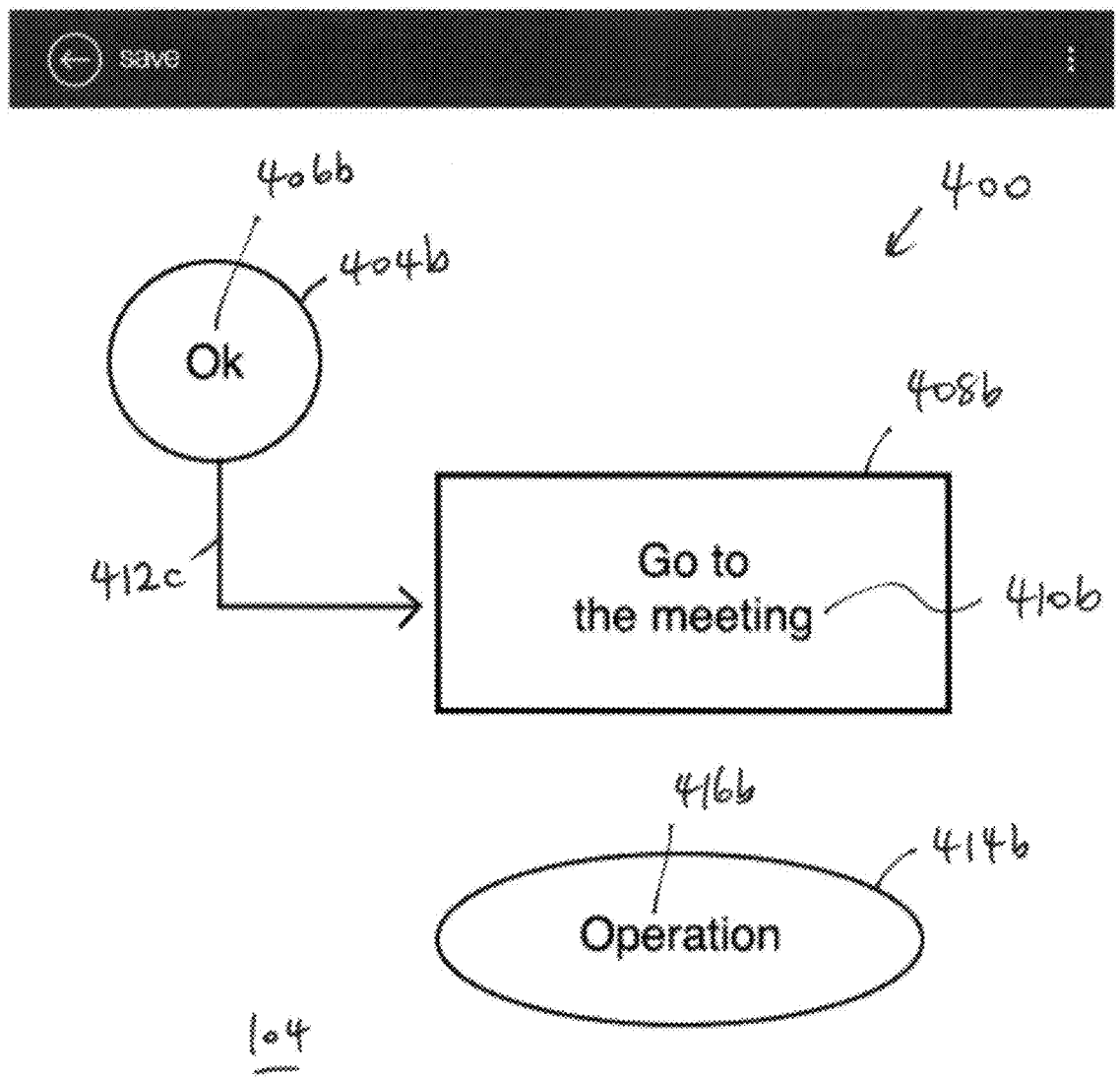
FIG. 22 shows the example diagram displayed in typeset ink.

FIG. 22 shows the completed diagram 400 displayed in typeset ink in response to user interaction with the application 112 to perform typesetting, for example. That is, the diagram elements are displayed as a typeset container 404b containing typeset text 406b, a typeset container 408b containing typeset text 410b, a typeset connector 412c connecting the typeset containers 404b and 408b, and a typeset container 414b containing typeset text 416b.

Figure 23:
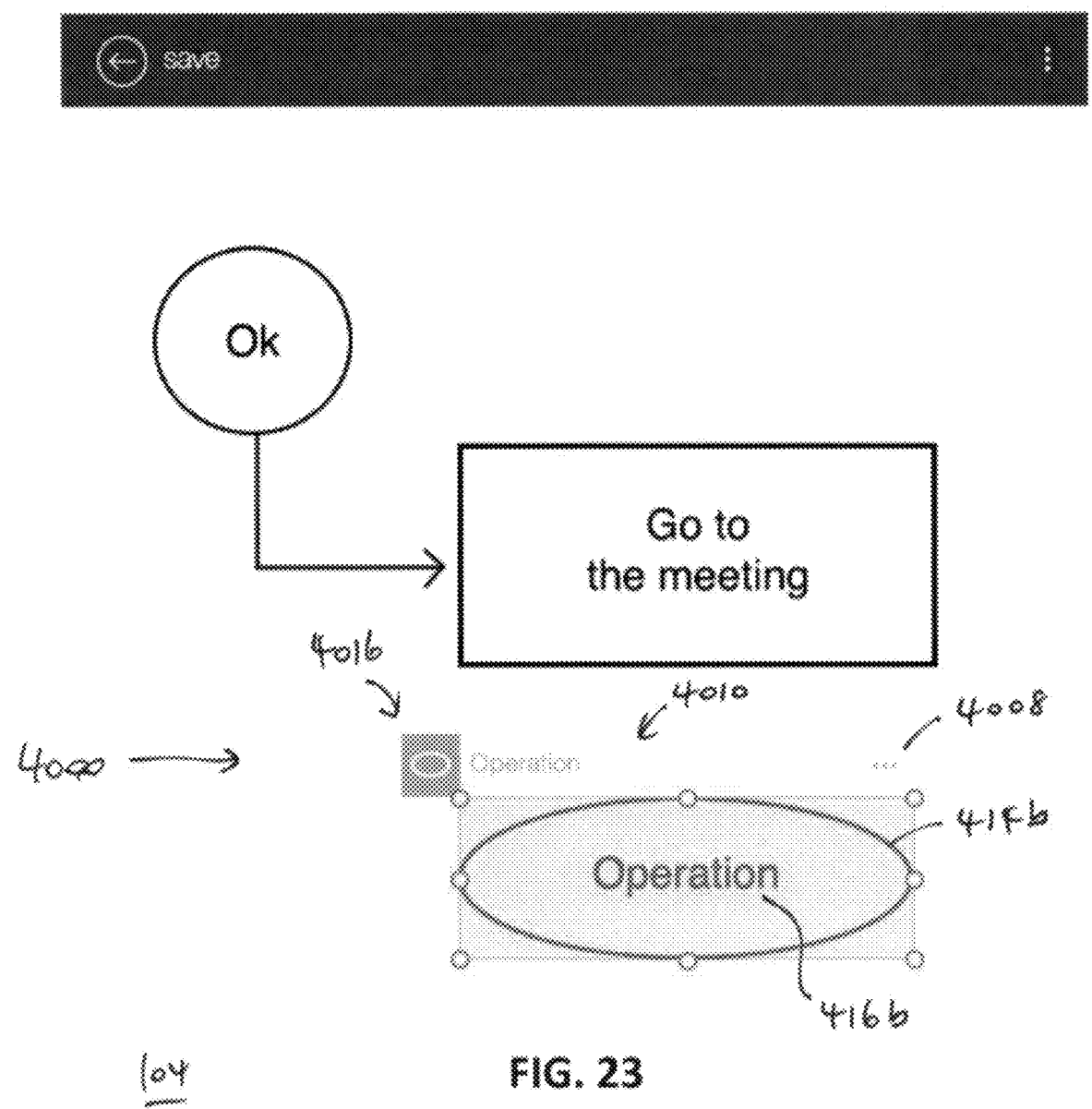
FIG. 23 shows the diagram state of FIG. 22 depicting selection of the shape and text element inputs of FIGS. 16 and 19 with associated components of the guide element.

FIG. 23 shows the typeset diagram 400 with the typeset container 414b and contained text 416b displayed in the afore-described selection mode rendering which includes the selected typeset version of the shape and text due to detection of a selection gesture on the container 414b, for example. In response, the full guide element 4000 of the shape prompter 4016, the text prompter 4010 and the control element 4008 is displayed, as before.

Figure 24:
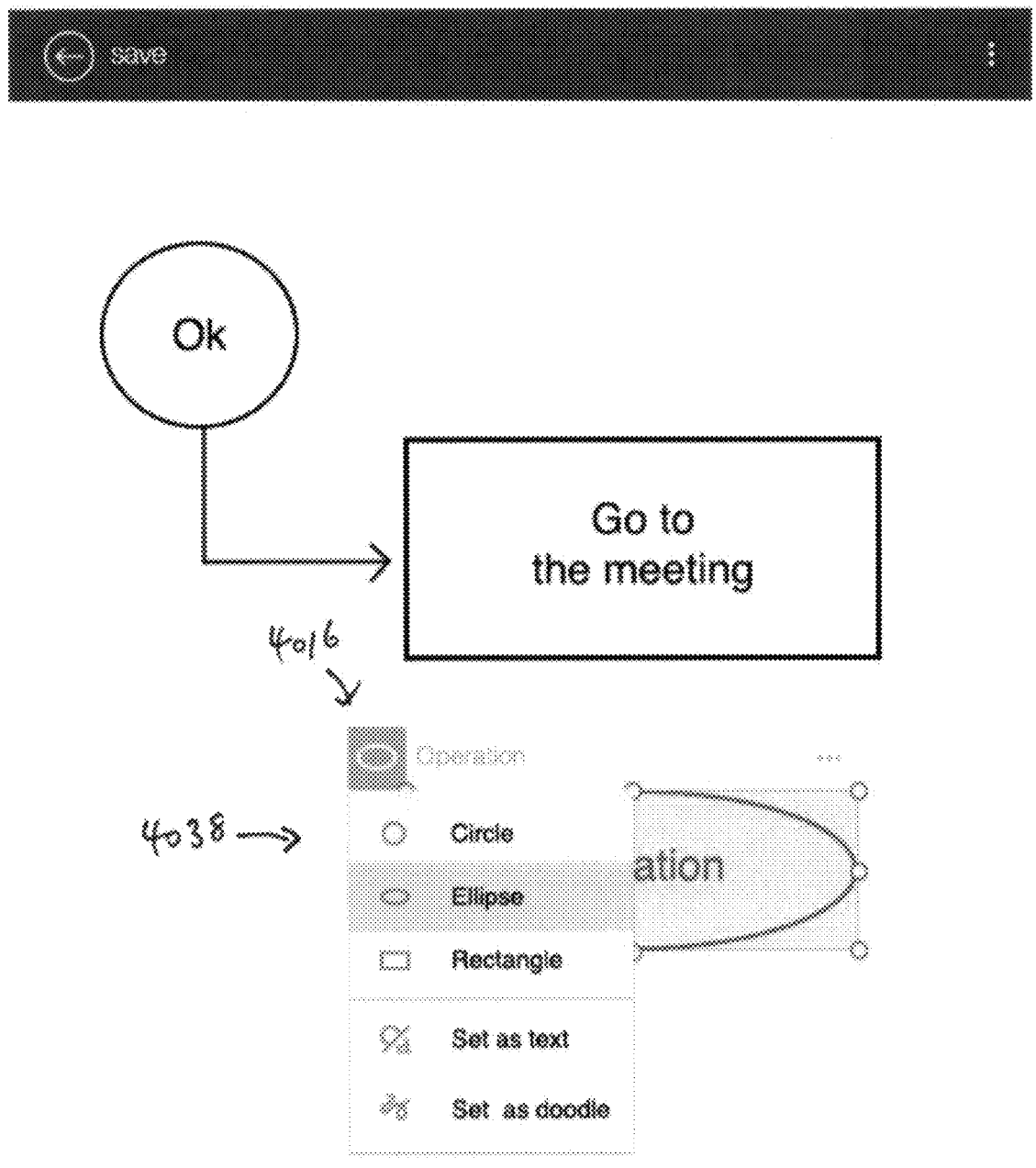
FIG. 24 shows the diagram state of FIG. 23 depicting menu display from selection of a component of the guide element for the selected elements.
Figure 25:
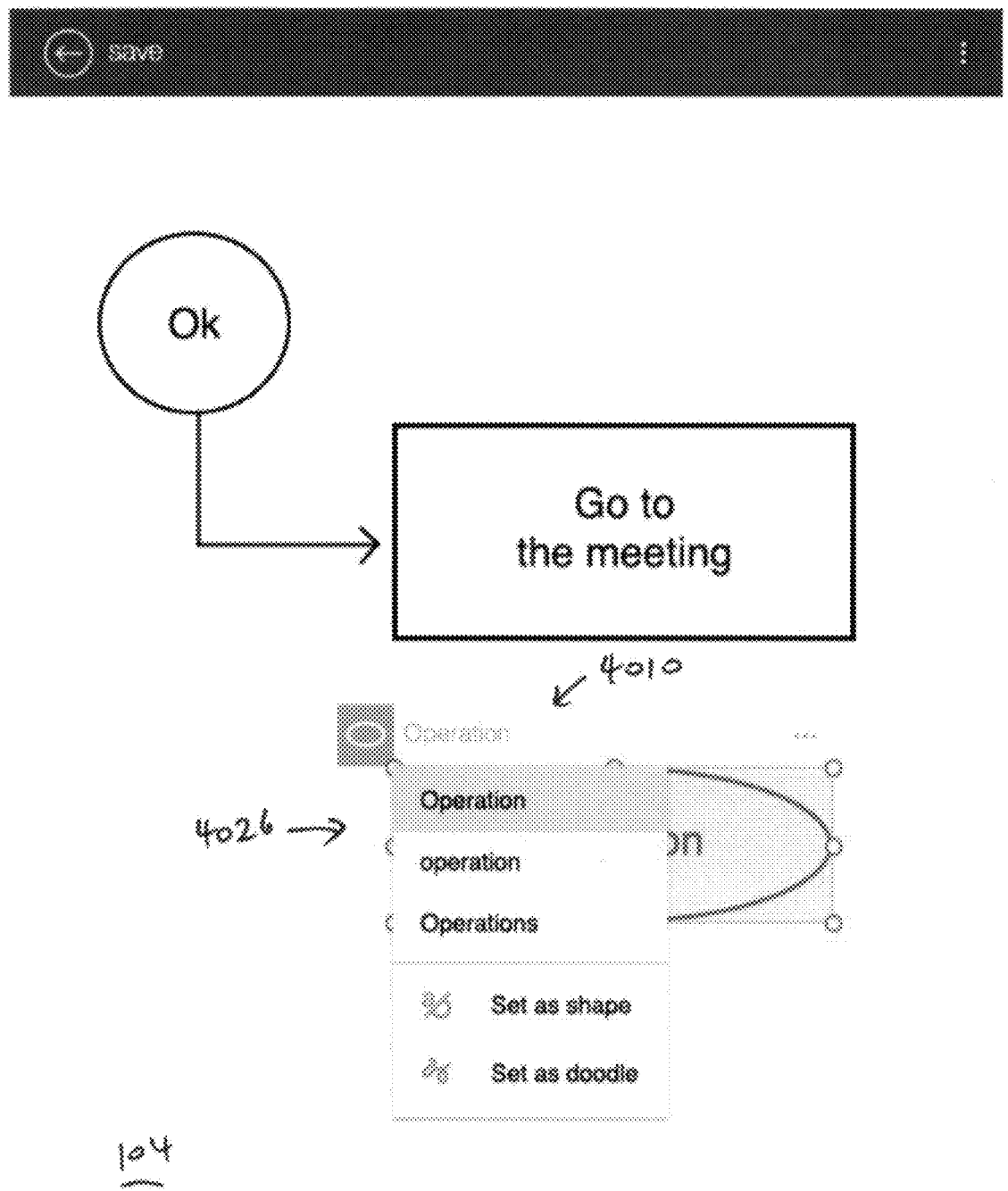
FIG. 25 shows the diagram state of FIG. 23 depicting another menu display from selection of another component of the guide element for the selected elements.
Figure 26:
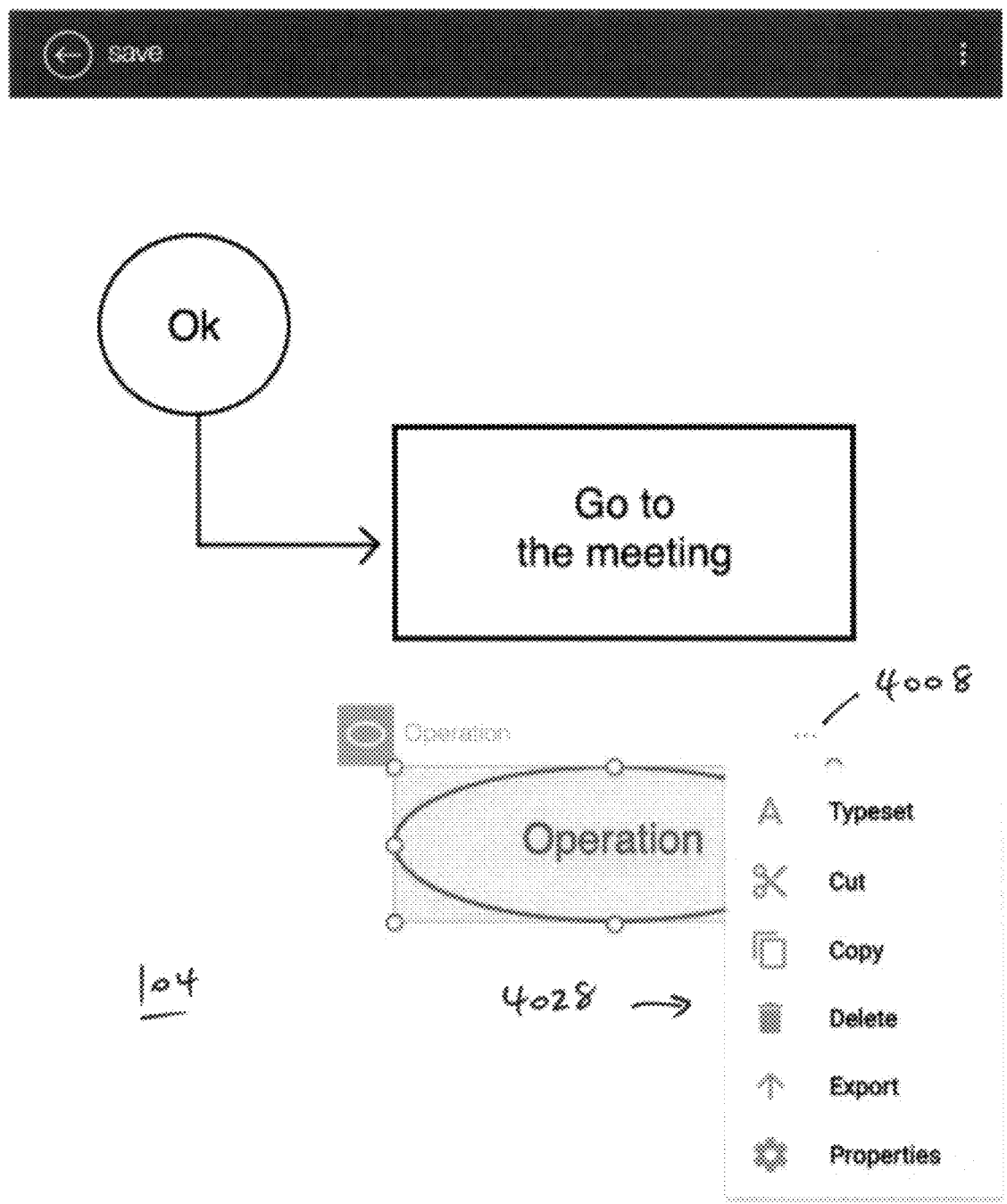
FIG. 26 shows the diagram state of FIG. 23 depicting another menu display from selection of another component of the guide element for the selected elements.

FIGS. 24, 25 and 26 respectively show the shape, text and control menus 4038, 4026 and 4028 variously having the afore-described interactive actions displayed upon detection of selection gestures on the shape prompter 4016, the text prompter 4010 and the control element 4008, respectively.

Figure 27:
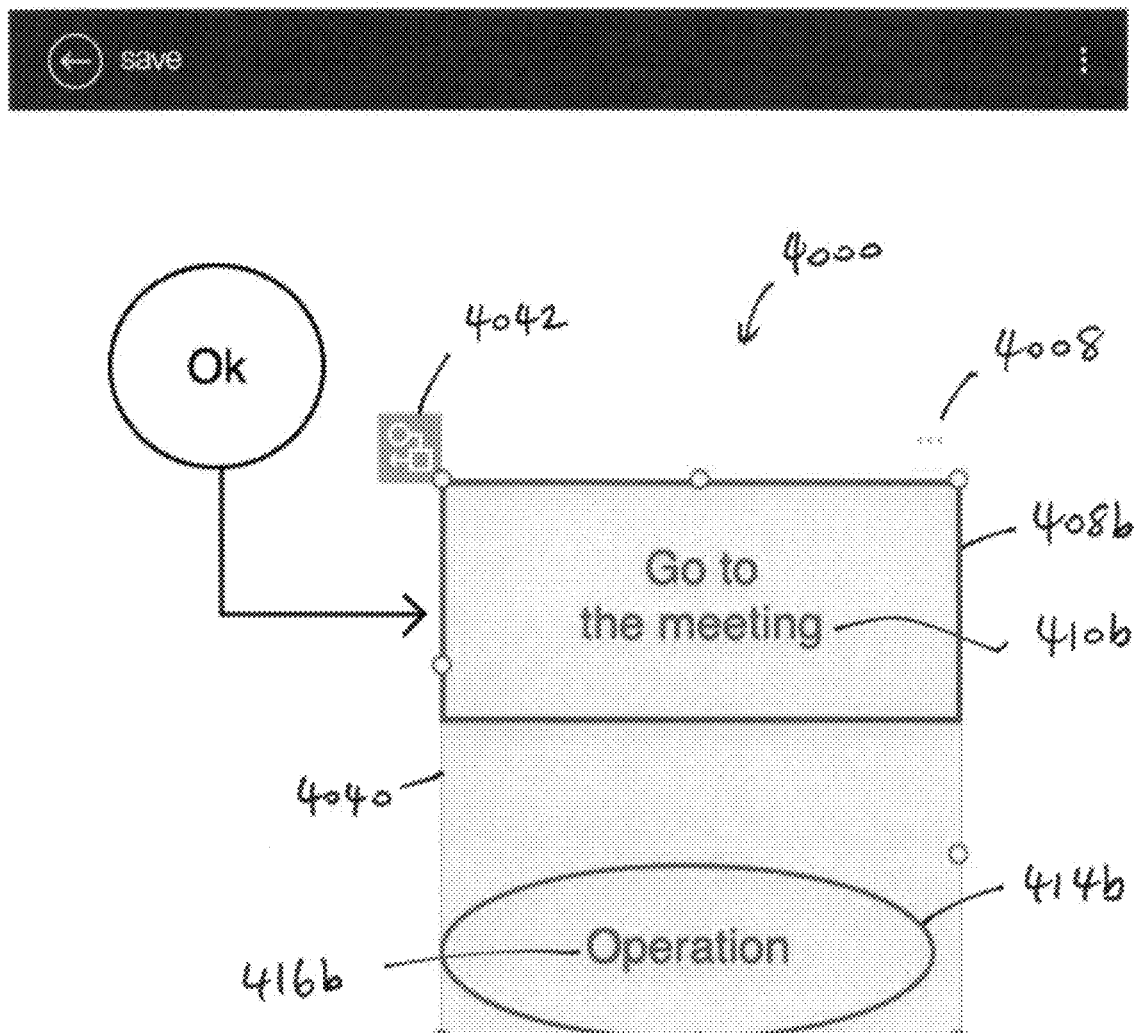
FIG. 27 shows the diagram state of FIG. 22 depicting multi-selection of the shape and text elements with associated components of the guide element.

FIG. 27 shows the typeset diagram 400 with the typeset container 408b and contained text 410b and the typeset container 414b and contained text 416b displayed in the afore-described selection mode rendering with a selection box 4040 about all of the selected elements, due to detection of a multi-selection gesture, such as a single-point gesture on one of the containers 408b and 414b, e.g., a long press, followed by another single-point gesture on the other containers, e.g., a short tap, by the application 112. In response, the guide element 4000 is displayed including a multi-element prompter 4042 and the control element 4008. Like the other prompters and components of the guide element, the multi-element prompter 4042 is interactive.

Figure 28:
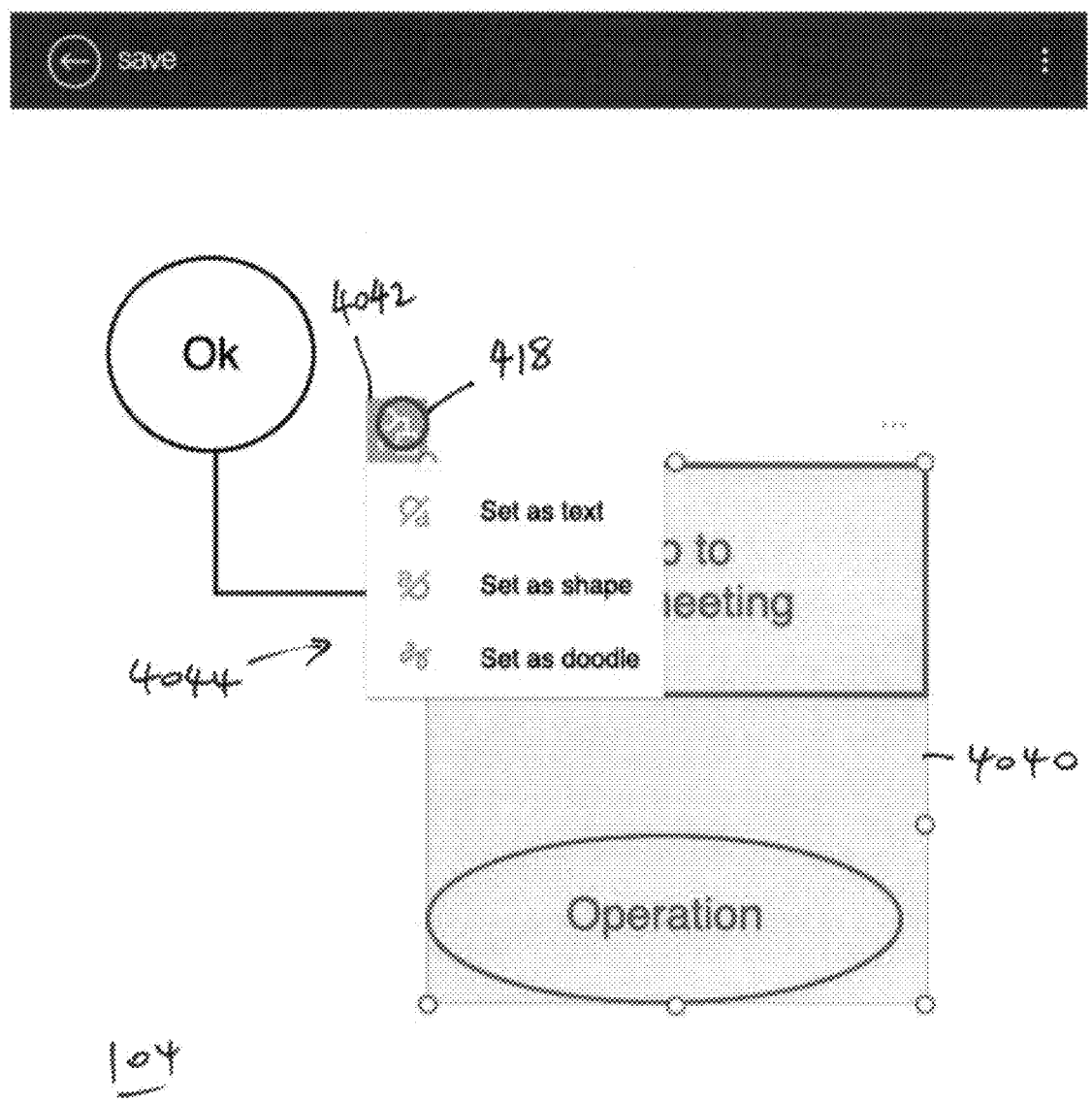
FIG. 28 shows the diagram state of FIG. 27 depicting menu display from selection of a component of the guide element for the multi-selected elements.

FIG. 28 shows the selection mode of FIG. 27 with a menu 4044 displayed in response to detection of a selection gesture 418 on the multi-element prompter 4042. The multi-element menu 4044 displays a list of manual classification actions, including the afore-described "Set as text", "Set as shape" and "set as doodle" actions. Each action of the menu 4044 is individually interactive through selection with the detection of a selection gesture thereon, such as a single-point gesture, e.g., a single tap or long press, by the application 112. Selection of these actions causes all elements of the multi-selection to be re-classified and re-recognized accordingly. In the multi-select mode, selection of the control element 4008 launches the control menu 4028 with the interactive elements described earlier.

As described earlier, input shapes that are parsed to the recognizer but not recognized because, for example, they are out-of-lexicon shapes, are treated as doodles, and therefore not rendered in typeset ink in a typesetted diagram. This non-recognition occurs where the recognizer 118 is configured to only return recognition output if a candidate above a certain probability score threshold is determined. An example doodle input to the diagram 400 is now described with reference to FIGS. 29 to 31.

Figure 29:
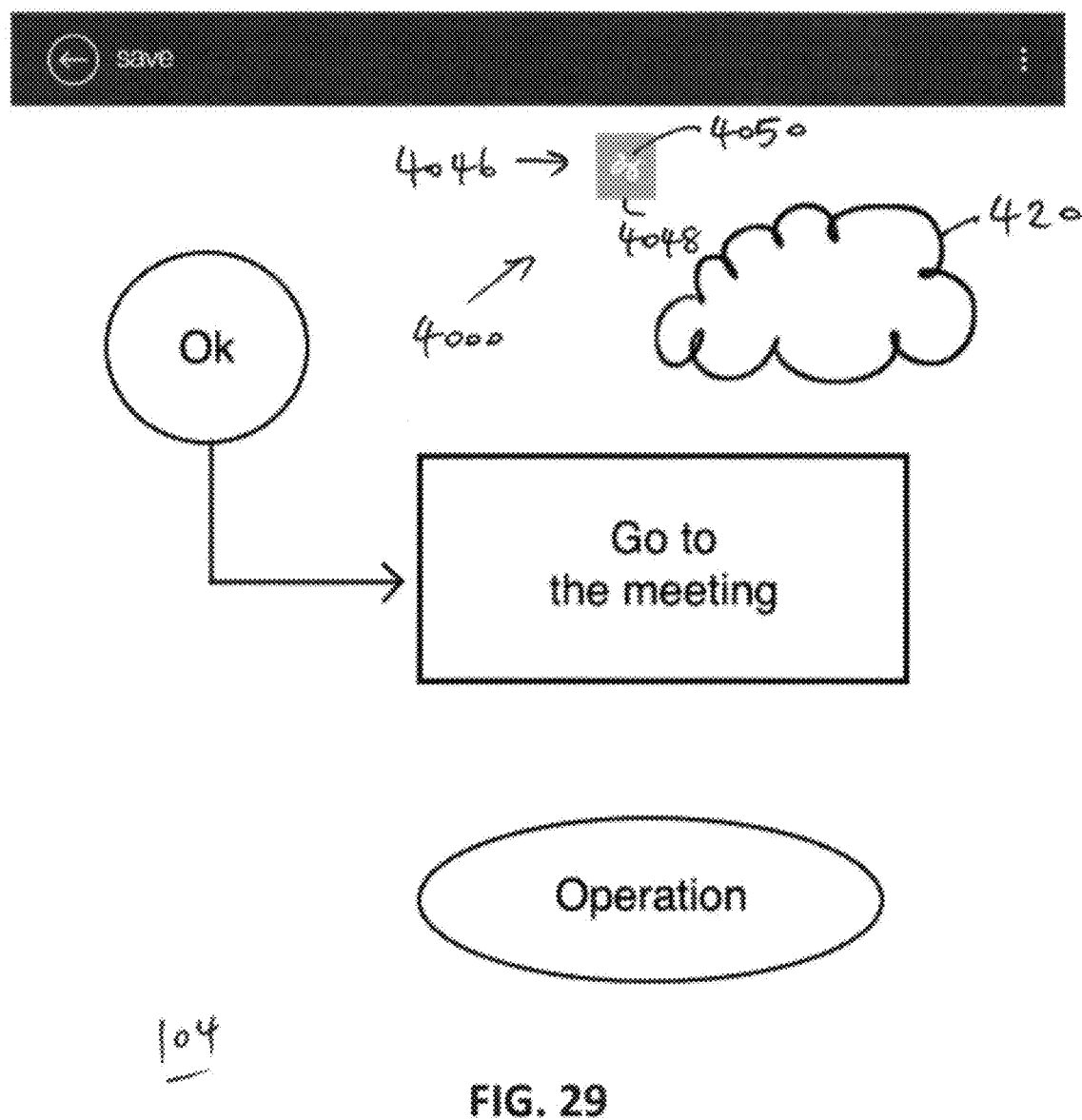
FIG. 29 shows further input of a hand-drawn free-form shape element to the example diagram of FIG. 22 with associated components of the guide element.

FIG. 29 shows the input of a shape element 420 drawn as a free-form shape above the typeset container 408b. The new input to the typeset diagram 400 is displayed as digital ink, unless a setting has been made to incrementally typeset new input. At this point, the shape element 404 is identified as non-text by the disambiguation system and method but is not recognized by the recognizer 118 as it is an out-of-lexicon shape. In order to provide users with feedback of this failed recognition, upon detection of the beginning of input and the rendering of the corresponding digital ink on the interface 104 the present system and method initiates display of the guide element 4000 as a free-form prompter 4046 above the hand-drawn shape 420 (as set by the alignment grid, for example) which has a free-form component 4048 including a doodle graphic 4050. So as not to distract user input, the free-form prompter 4046 is displayed with the same or similar light and subtle rendering as the other prompters and display is retained in a similar manner.

Figure 30:
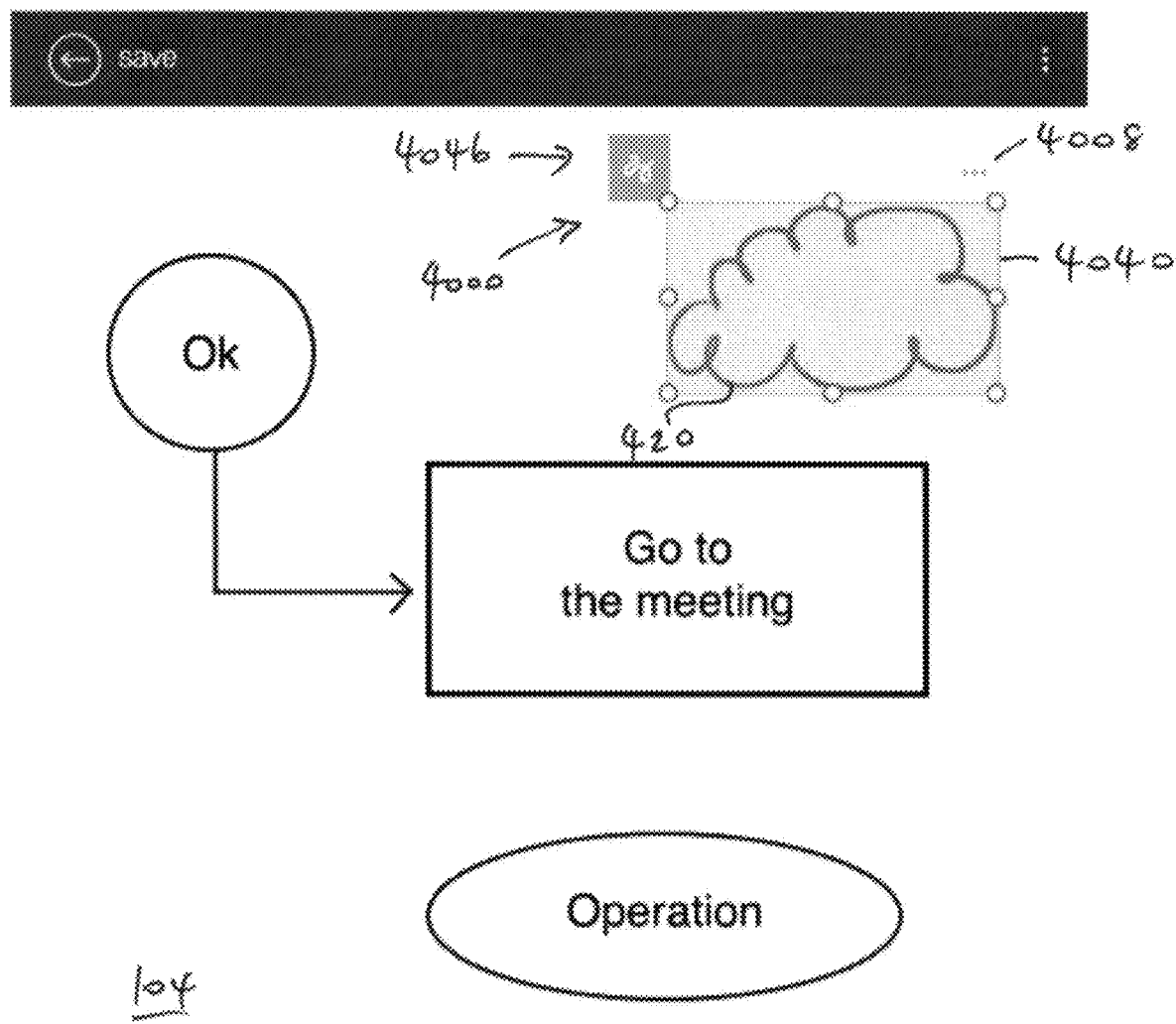
FIG. 30 shows the diagram state of FIG. 29 depicting selection of the free-form shape with associated components of the guide element.

FIG. 30 shows the typeset diagram 400 with the digital ink shape 420 displayed in the afore-described selection mode rendering with a selection box 4040 about the selected element, due to detection of a selection gesture, such as a single-point gesture, e.g., a short tap, on the shape by the application 112. In response, the guide element 4000 is displayed including the free-form prompter 4046 and the control element 4008. Like the other prompters and components of the guide element, the free-form prompter 4046 is interactive.

Figure 31:
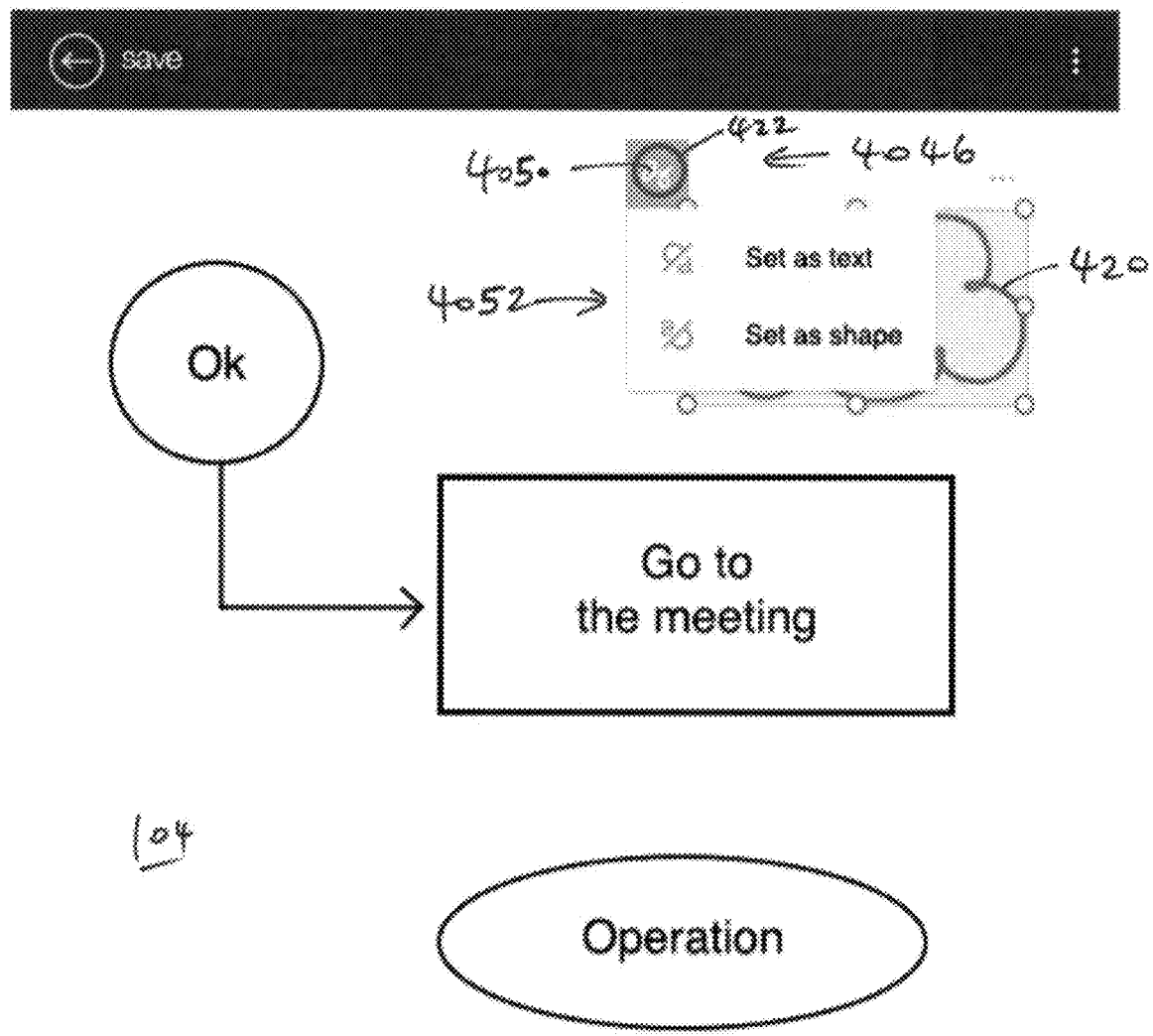
FIG. 31 shows the diagram state of FIG. 30 depicting menu display from selection of a component of the guide element for the selected free-from element.

FIG. 31 shows the selection mode of FIG. 30 with a menu 4052 displayed in response to detection of a selection gesture 422 on the free-form component 4048. The doodle menu 4052 displays a list of manual classification actions, including the afore-described "Set as text" and "Set as shape" actions. Each action of the menu 4052 is individually interactive through selection with the detection of a selection gesture thereon, such as a single-point gesture, e.g., a single tap or long press, by the application 112. Selection of these actions causes the selected non-recognized free-form element to be re-classified and re-recognized (for example, this manual reclassification may prompt the recognizer 118 to return the best candidate for the free-form shape under the probability score threshold) accordingly.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for guiding hand-drawing of diagrams including text and non-text elements on a computing device, the computing device comprising a processor and at least one non-transitory computer readable medium for detecting and recognizing hand-drawing diagram element input under control of the processor, the at least one non-transitory computer readable medium configured to:

accept input of, on an input area of an interactive display of the computing device:
a non-text hand-drawing diagram element, and
a selection gesture; and
cause display of, on the interactive display:
a digital ink of the non-text hand-drawing diagram element,
a recognized form of the non-text hand-drawing diagram element overlaid on the digital ink of the non-text hand-drawing diagram element, wherein the recognized form of the non-text hand-drawing diagram element includes one or more geometric characteristics of the digital ink of the non-text hand-drawing diagram element and permits modification of one or more of the geometric characteristics of the recognized form of the non-text hand-drawing diagram element, and
a dynamic prompter which dynamically displays at least one depiction of the non-text hand-drawing diagram element, the dynamic prompter configured with the recognized form of the non-text hand-drawing diagram element and geometrically similar variants of the non-text hand-drawing diagram element;

wherein the computer readable medium is configured to cause display of the dynamic prompter in response to the selection gesture selecting the digital ink of the non-text hand-drawing diagram element; and wherein the recognized form of the non-text hand-drawing diagram element is initially determined based on a probability score calculated from at least one of: a spatial score, a temporal score, and an input characteristic of the non-text hand-drawing diagram element.

2. A system as claimed in claim 1, wherein the dynamic prompter dynamically displays at least one depiction of a handwriting text diagram element as handwriting is input.

3. A system as claimed in claim 1, wherein the dynamic prompter includes at least one interactive prompter element, the at least one non-transitory computer readable medium configured to display an action menu in response to receiving interaction with the at least one interactive prompter element.

4. A system as claimed in claim 1, the at least one non-transitory computer readable medium configured to display the depiction of a non-text element in icon form.

5. A system as claimed in claim 4, wherein the non-text element is a shape element of the diagram, the icon depicting the shape.

6. A system as claimed in claim 1, the at least one non-transitory computer readable medium configured to display the depiction of a text element in typeset ink.

7. A method for guiding hand-drawing of diagrams including text and non-text elements on a computing device, the computing device comprising a processor and at least one non-transitory computer readable medium for detecting and recognizing hand-drawing diagram element input under control of the processor, the method comprising:
  inputting, on an input area of an interactive display of the computing device:
    a non-text hand-drawing diagram element, and
    a selection gesture; and
  displaying, on the interactive display:
    a recognized form of the non-text hand-drawing diagram element overlaid on the digital ink of the non-text hand-drawing diagram element, wherein the recognized form of the non-text hand-drawing diagram element includes one or more geometric characteristics of the digital ink of the non-text hand-drawing diagram element and permits modification of one or more of the geometric characteristics of the recognized form of the non-text hand-drawing diagram element, and
    a dynamic prompter which dynamically displays at least one depiction of the non-text hand-drawing diagram element, the dynamic prompter configured with the recognized form of the non-text hand-drawing diagram element and geometrically similar variants of the non-text hand-drawing diagram element;
  wherein the dynamic prompter is displayed in response to selecting, via the selection gesture, the digital ink of the non-text hand-drawing diagram element; and
  wherein the recognized form of the non-text hand-drawing diagram element is initially determined based on a probability score calculated from at least one of: a spatial score, a temporal score, and an input characteristic of the non-text hand-drawing diagram element.

8. A method as claimed in claim 7, wherein the dynamic prompter dynamically displays at least one depiction of a handwriting text diagram element as the handwriting is input.

9. A method as claimed in claim 7, wherein the dynamic prompter includes at least one interactive prompter element, the at least one non-transitory computer readable medium configured to display an action menu in response to receiving interaction with the at least one interactive prompter element.

10. A method as claimed in claim 7, comprising displaying the depiction of a non-text element in icon form.

11. A method as claimed in claim 10, wherein the non-text element is a shape element of the diagram, the icon depicting the shape.

12. A method as claimed in claim 7, comprising displaying the depiction of a text element in typeset ink.

13. A non-transitory computer readable medium having a computer readable program code embodied therein, said computer readable program code adapted to be executed to implement a method for guiding hand-drawing of diagrams including text and non-text elements on a computing device, the computing device comprising a processor and at least one non-transitory computer readable medium for detecting and recognizing hand-drawing diagram element input under control of the processor, the method comprising:
  inputting, on an input area of an interactive display of the computing device:
    a non-text hand-drawing diagram element, and
    a selection gesture; and
  displaying, on the interactive display:
    a recognized form of the non-text hand-drawing diagram element overlaid on the digital ink of the non-text hand-drawing diagram element, wherein the recognized form of the non-text hand-drawing diagram element includes one or more geometric characteristics of the digital ink of the non-text hand-drawing diagram element and permits modification of one or more of the geometric characteristics of the recognized form of the non-text hand-drawing diagram element, and
    a dynamic prompter which dynamically displays at least one depiction of the non-text hand-drawing diagram element, the dynamic prompter configured with the recognized form of the non-text hand-drawing diagram element and geometrically similar variants of the non-text hand-drawing diagram element;
  wherein the dynamic prompter is displayed in response to selecting, via the selection gesture, the digital ink of the non-text hand-drawing diagram element; and
  wherein the recognized form of the non-text hand-drawing diagram element is initially determined based on a probability score calculated from at least one of: a spatial score, a temporal score, and an input characteristic of the non-text hand-drawing diagram element.

14. A non-transitory computer readable medium as claimed in claim 13, wherein the dynamic prompter dynamically displays at least one diagram element as the handwriting is input.

15. A non-transitory computer readable medium as claimed in claim 13, wherein the dynamic prompter includes at least one interactive prompter element, the at least one non-transitory computer readable medium configured to display an action menu in response to receiving interaction with the at least one interactive prompter element.

16. A non-transitory computer readable medium as claimed in claim 13, the method comprising displaying the depiction of a non-text element in icon form.

17. A non-transitory computer readable medium as claimed in claim 16, wherein the non-text element is a shape element of the diagram, the icon depicting the shape.

18. A non-transitory computer readable medium as claimed in claim 13, the method comprising displaying the depiction of a text element in typeset ink.

19. A system as claimed in claim 1, wherein the recognized form of the non-text hand-drawing diagram element is visually emphasized relative to the digital ink of the non-text hand-drawing diagram element.

20. A system as claimed in claim 19, wherein the visual emphasis consists of bolding the recognized form of the non-text hand drawing diagram relative to the digital ink of the non-text hand-drawing diagram element.

\* \* \* \* \*